(12) United States Patent
Moos et al.

(10) Patent No.: US 11,608,740 B2
(45) Date of Patent: Mar. 21, 2023

(54) DETERMINING FRACTURE PROPERTIES USING INJECTION AND STEP-RATE ANALYSIS, DYNAMIC INJECTION TEST ANALYSIS, EXTRACTING PULSE-TYPE SOURCE SIGNALS FROM NOISY DATA, AND MEASURING FRICTION PARAMETERS IN A WELL

(71) Applicant: Seismos, Inc., Austin, TX (US)

(72) Inventors: Daniel Moos, Palo Alto, CA (US); Youli Quan, Houston, TX (US); Junwei Zhang, Austin, TX (US); Eric M. Dunham, Palo Alto, CA (US)

(73) Assignee: Seismos, Inc., Austin, TX (US)

( * ) Notice: Subject to any disclaimer, the term of this patent is extended or adjusted under 35 U.S.C. 154(b) by 20 days.

(21) Appl. No.: 17/091,155

(22) Filed: Nov. 6, 2020

(65) Prior Publication Data
US 2021/0054736 A1 Feb. 25, 2021

Related U.S. Application Data

(63) Continuation of application No. PCT/US2019/031205, filed on May 7, 2019.

(60) Provisional application No. 62/668,117, filed on May 7, 2018.

(51) Int. Cl.
| | |
|---|---|
| E21B 47/06 | (2012.01) |
| E21B 47/09 | (2012.01) |
| E21B 49/00 | (2006.01) |
| E21B 43/26 | (2006.01) |
| E21B 43/12 | (2006.01) |

(52) U.S. Cl.
CPC .......... *E21B 49/008* (2013.01); *E21B 43/12* (2013.01); *E21B 43/26* (2013.01)

(58) Field of Classification Search
CPC ........ E21B 47/06; E21B 47/003; E21B 47/09; E21B 47/095; E21B 49/00; E21B 49/006; E21B 49/008; E21B 43/26; G01V 1/44
See application file for complete search history.

(56) References Cited

U.S. PATENT DOCUMENTS

| | | | | |
|---|---|---|---|---|
| 5,093,811 | A * | 3/1992 | Mellor | G01V 1/44 |
| | | | | 73/152.58 |
| 7,313,481 | B2 * | 12/2007 | Moos | G01V 1/44 |
| | | | | 73/152.22 |
| 8,838,427 | B2 | 9/2014 | Segal et al. | |
| 9,879,514 | B2 * | 1/2018 | Ciezobka | E21B 43/267 |
| 10,385,670 | B2 * | 8/2019 | James | E21B 49/008 |
| 10,385,686 | B2 * | 8/2019 | James | E21B 43/26 |
| 10,578,766 | B2 * | 3/2020 | Abou-Sayed | G01V 99/00 |
| 10,641,090 | B2 * | 5/2020 | Felkl | E21B 47/06 |

(Continued)

OTHER PUBLICATIONS

International Search Report and Written Opinion, International Application No. PCT/US19/31205 dated Aug. 16, 2019.

*Primary Examiner* — Kenneth L Thompson
(74) *Attorney, Agent, or Firm* — Richard A. Fagin

(57) ABSTRACT

A method and a system to determine fracture properties during standard operations and injection tests. Fracture compliance, fracture closure pressure, and perforation friction can be determined using a combination of acoustic data, pressure decay data, and wellbore models. A method of automating and adjusting fracture design in real-time. A method and system to recover active, single active pulse data from a background noise dataset.

26 Claims, 28 Drawing Sheets

(56) References Cited

U.S. PATENT DOCUMENTS

| | | |
|---|---|---|
| 2003/0079875 A1 | 5/2003 | Weng |
| 2012/0234534 A1 | 9/2012 | Hughes et al. |
| 2016/0025894 A1 | 1/2016 | Abou-Sayed et al. |
| 2016/0103235 A1 | 4/2016 | Shampine et al. |
| 2019/0129047 A1* | 5/2019 | Clark .................... G01V 1/137 |
| 2020/0190976 A1* | 6/2020 | Jaaskelainen ......... E21B 43/263 |

* cited by examiner

DETERMINING FRACTURE PROPERTIES USING INJECTION AND STEP-RATE ANALYSIS, DYNAMIC INJECTION TEST ANALYSIS, EXTRACTING PULSE-TYPE SOURCE SIGNALS FROM NOISY DATA, AND MEASURING FRICTION PARAMETERS IN A WELL

CROSS REFERENCE TO RELATED APPLICATIONS

Continuation of International Application No. PCT/US19/31205 filed May 7, 2019. Priority is claimed from U.S. Provisional Application No. 62/668,117 filed on May 7, 2018. Both the foregoing applications are incorporated herein by reference in their entirety.

STATEMENT REGARDING FEDERALLY SPONSORED RESEARCH OR DEVELOPMENT

Not Applicable.

Names of the Parties to a Joint Research Agreement

Not Applicable.

BACKGROUND

This disclosure relates to the field of seismic analysis and hydraulic fracture as well as hydraulic fracturing process monitoring and evaluation. In particular, the monitoring can quickly deliver relevant information during a stimulation treatment, providing immediate measures to improve and adjust the stimulation process.

DFITs (Diagnostic Fracture Injection Tests, also known as Mini Fracs or injection tests) are carried out as part of design and field hydraulic fracturing to determine properties of interest of the formation having undergone stimulation. DFIT is a service mark of Halliburton Energy Services, Inc., Houston, Tex. An injection test is a low-rate fluid injection test which creates a small fracture in a subsurface formation by pumping a clear fluid into a short length interval of a well drilled through the formations, typically using a total fluid volume less than a few hundred barrels. The well is then shut in (closed hydraulically at the surface) and well fluid pressure is monitored to record the pressure decay with respect to time. Pressure and rate are recorded and analyzed using conventional fracture diagnostics. Post shut-in analysis is carried out using a simple reservoir model. In some cases, step rate testing is performed as part of an injection test.

Analysis of an injection test is carried out using well-known methods of reservoir engineering and fracture diagnostics modeling (e.g., Soliman, Gamadi 2012, Barree 2009, 2007, SPE Mar. 14, 2013) to provide estimates of:
1. fracture closure pressure—this provides information to allow computation of the pressure to ensure sufficient aperture to place proppant, among other things;
2. reservoir pressure, required for reservoir modeling; and
3. reservoir permeability, required for reservoir modeling.

Limitations of these methods include that fracture closure is inferred solely from the shape of the pressure decay after shut in, which may be hard to interpret in low permeability reservoirs. Also limiting is that sufficient time must elapse to allow this to occur, and further that an even longer time, which may be on the order of days to weeks, may be needed for pressure diffusion into the reservoir to progress far enough so that the correct formation pressure and permeability values can be determined; in unconventional reservoirs, there may be insufficient enough time to wait for these events. Thus, results are often ambiguous. For this reason, DFITs are either not conducted frequently, or are very expensive because of the long wait times; this leads to inefficient fracturing operations and to lost time when operations fail. Methods such as choked flow-back can be used to reduce the time required to extract the information needed, but this is done infrequently because of operational difficulties and lack of appropriate expertise on site to ensure the operation is carried out correctly; also it leads to additional complexities determining the parameters of interest from the data.

Further limitations are that information and properties useful to reservoir and hydraulic fracture engineers cannot be obtained from DFIT data using approaches known in the art. Examples of these properties include fracture compliance and fracture conductivity as a function of fluid pressure.

For designing and performing a hydraulic fracturing treatment, it is important to determine the friction created by fluid flow into the treated formation(s). Using injection and step-rate tests, where injection rate is abruptly changed to carry out injection at a number of stable rates and pressures, total friction can be determined. However, both perforation (openings in a well casing or liner) friction and pipe flow friction are entangled in such a measurement.

Step rate tests are carried out during hydraulic fracturing operations for several reasons. Primarily, they are designed to extract information from the pressure required to maintain a series of (increasing) or decreasing flow rates:
1. to quantify perforation and near-wellbore friction; this is a common practice in fracture diagnostics; In addition:
2. in micro-fracturing, primarily with clear water, the pressure extrapolated to zero flow rate allows estimation of the fracture extension pressure; to use this approach to constrain the least principal stress requires that the fracture extension pressure is approximately equal to or only slightly greater than the least stress.

SUMMARY

A method according to one aspect of the present disclosure for characterizing properties of subsurface fracture and reservoir includes inducing a fracture in a subsurface region connected to a wellbore. At least one of pressure and a time derivative of pressure in the well is measured. A tube wave is generated in the wellbore. The measured at least one of pressure and time derivative of pressure is used to determine a fracture width from detected tube wave events in the measured at least one of pressure and time derivative. A relationship between pressure and fracture width is determined. The relationship is used to determine at least one of a fracture property and a reservoir formation property.

In some embodiments, the fracture property comprises at least one of fracture compliance, fracture closure pressure and fracture size.

Some embodiments further comprise determining a change in the fracture property with respect to time.

Some embodiments further comprise extrapolating a future value of the at least one of a fracture property and reservoir property after and end of a fluid pumping operation used to induce the fracture.

In some embodiments, fracture compliance is determined as a rate of decrease of fracture width with respect to pressure.

In some embodiments, fracture conductivity is determined as a function of fluid pressure.

In some embodiments, the generating a tube wave in the wellbore comprises stopping a pump to induce water hammer.

In some embodiments, the inducing a fracture comprises pumping a selected volume of fluid to constrain geometry of the fracture.

In some embodiments, the reservoir property comprises at least one of reservoir formation pressure and reservoir formation permeability.

In some embodiments, the at least one of pressure and a time derivative of pressure is measured at a location proximate to a wellhead.

Some embodiments further comprise using the fracture property to adjust at least one operating parameter of a subsequent hydraulic fracture treatment.

In some embodiments, the at least one operating parameter comprises facture fluid pumping rate, proppant concentration, proppant particle size distribution and fluid viscosity.

In some embodiments, the extrapolated value of the fracture property comprises at least one of fracture width, fracture length, fracture compliance and fracture closure pressure.

Some embodiments further comprise using the extrapolated value, reservoir permeability and formation tortuosity to adjust at least one operating parameter of a subsequent hydraulic fracture treatment.

In some embodiments, the at least one operating parameter comprises facture fluid pumping rate, proppant concentration, proppant particle size distribution and fluid viscosity.

A method according to another aspect of the present disclosure for characterizing properties of a subsurface reservoir includes inducing a fracture in a subsurface reservoir connected to a wellbore. The fracture is extended by injecting a fluid into the wellbore at a first flow rate. The flow rate is changed to a second flow rate, the changing flow rate performed so as to induce tube waves in the wellbore. A pressure and at least one of a fluid flow rate and time derivative of pressure are measured in the wellbore. The measured at least one of pressure and time derivative of pressure is inverted into fracture width using detected tube wave events in the measured at least one of pressure and time derivative of pressure. A relationship is determined between fluid pressure and fracture width. The relationship is used to determine at least one of a fracture property and reservoir property. The determined fracture property or reservoir property is adjusted for pressure drop in the wellbore and in the fracture.

In some embodiments, the extending the fracture comprises the change in the flow rate being at least one of a stepwise increase and a stepwise decrease.

In some embodiments, the fracture property comprises at least one of a pressure drop associated with fluid flow in the wellbore, pressure drop through perforations in a wellbore casing, pressure drop due to near-wellbore formation tortuosity, and pressure drop due to flow through the fracture.

In some embodiments, pressure drop associated with the fluid flow through the fracture is related to at least one of fracture tortuosity and fracture complexity.

In some embodiments, the fracture property comprises at least one of fracture width, fracture length, fracture compliance, fracture closure pressure and fracture permeability.

A method for characterizing a wellbore according to another aspect comprises inducing a pressure change in the wellbore to excite tube waves in the wellbore. At least one of pressure and time derivative of pressure in the wellbore is measured. The measured at least one of pressure and time derivative is autocorrelated. A change in structure of the wellbore is determined from a result of the autocorrelating.

In some embodiments, the determining a change comprises detecting movement of a plug in the wellbore.

In some embodiments, the detecting movement comprises identifying a change in polarity of the result of the autocorrelating.

In some embodiments, the determining a change comprises determining whether a plug in the wellbore is open or closed.

Some embodiments further comprise pumping fluid into the wellbore, repeating the inducing a pressure change, detecting at least one of pressure and time derivative of pressure, autocorrelating the detected at least one of pressure and time derivative of pressure, and determining a further change in structure in the wellbore.

In some embodiments, the determining further change in structure comprises detecting movement of a plug in the wellbore.

In some embodiments, the detecting movement comprises identifying a change in polarity of the result of the autocorrelating.

In some embodiments, the determining further change in structure comprises determining whether a plug in the wellbore is open or closed.

In some embodiments, the determining a change comprises determining closure of a fracture.

DETAILED DESCRIPTION

This disclosure provides possible methods to determine some fractured reservoir characteristics in shorter time frames using water hammer and/or pulsed tube wave measurements to interrogate the subsurface region. The following disclosure provides for the friction and fracture properties to be more precisely determined. The present disclosure also provides for active measurements based on "noise" generated by a fracturing treatment or an injection test.

Step rate tests may be carried out during hydraulic fracturing operations for several reasons. Primarily, they are designed to extract information from the pressure required to maintain a series of (increasing) or decreasing flow rates:
1. to quantify perforation and near-wellbore friction; this is a common practice in fracture diagnostics; In addition;
2. in micro-fracturing, primarily with clear water, the pressure extrapolated to zero flow rate allows estimation of the fracture extension pressure; to use this approach to constrain the least principal stress requires that the fracture extension pressure is approximately equal to or only slightly greater than the least stress. Recovering pulse and reflection signals from noisy data is possible using autocorrelation and spectral plots, it is also possible to extract pulse information from noisy data as disclosed.

Figure 1:
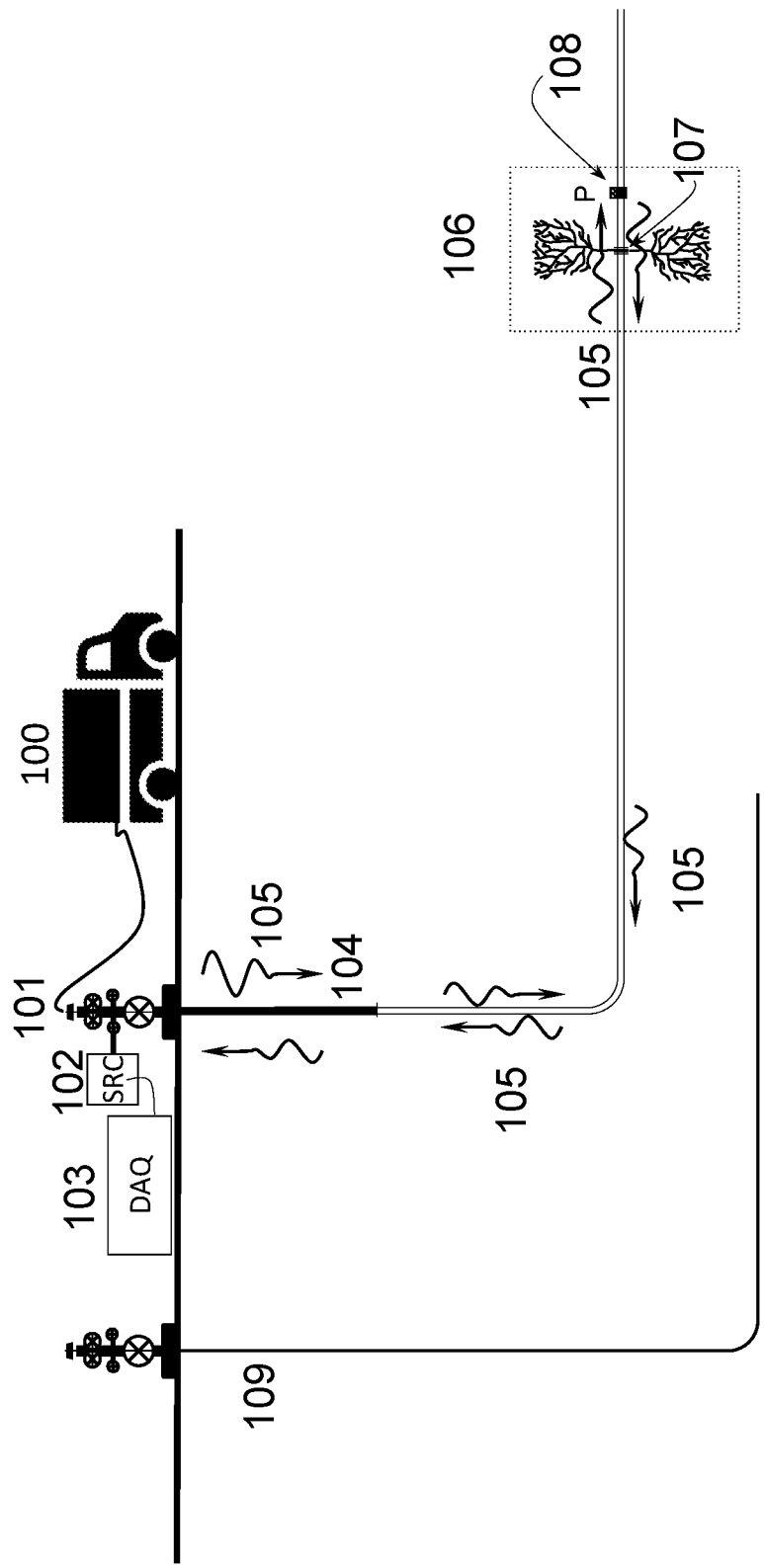
FIG. 1 depicts a representative hydraulic fracturing or an injection test operation set up with possible equipment, sensor, and source placements as well as depicting water hammer propagation up and down the wellbore.

The description below uses specific examples but is not necessarily the only intended or possible implementation or use of the disclosed methods. A person having skill in the art can derive similar implementations to the same goals. A typical implementation of methods according to this disclosure may include a hydraulic fracturing and data acquisition instrument system similar to what is shown in FIG. 1, along with the sensors, a pressure source or pulsed pressure source, and processing apparatus placed as depicted. Another combination, where the pressure or acoustic data is obtained from fiber-optic measurements is also possible. The equipment used may comprise, on a treated or analyzed vertical or deviated wellbore 101, fluid pump(s) 100, sensors (e.g., pressure transducers and hydrophone) a pulsed pressure source 102 and a signal processing unit 103. The source 102 may be used to generate pressure waves in the wellbore 101, which as will be explained below may induce tube waves in the wellbore 101. The wellbore may define a cased or open well 104, a stimulated area of interest 106 in a subsurface reservoir formation, perforation(s) or open sliding sleeve port(s) 107 that hydraulically connect the well 104 to the reservoir formation, and a plug or wellbore bottom 108. A nearby wellbore 109 may be present in the area of interest. A propagating water hammer 105 may be generated either by a change in rate of pumping, or a tube wave may be generated such as by the source 102.

An active source may be implemented in some embodiments by injecting or removing a slug of fluid from the wellbore 101, by closing and opening a valve with a pressure differential, moving a pump piston, or by slightly and rapidly changing the entire volume of the system, or its component; all of which result in a pressure disturbance (this may be accomplished by—as an example—a piston rapidly moving in or out of the wellbore system). It can also be created by a step-rate "pulsing" while pumping, or a water hammer due to step rate (flow rate changes) can be utilized. In general, any quick perturbation of a steady state flow— due to conscious operational decision or an unplanned factor, has a potential to generate a water hammer, and thus may constitute an "active source" for the analysis described below. Other embodiments may use the pulsed pressure source 102.

Dynamic Diagnostic Fracture Injection Tests and Analysis

Figure 2:
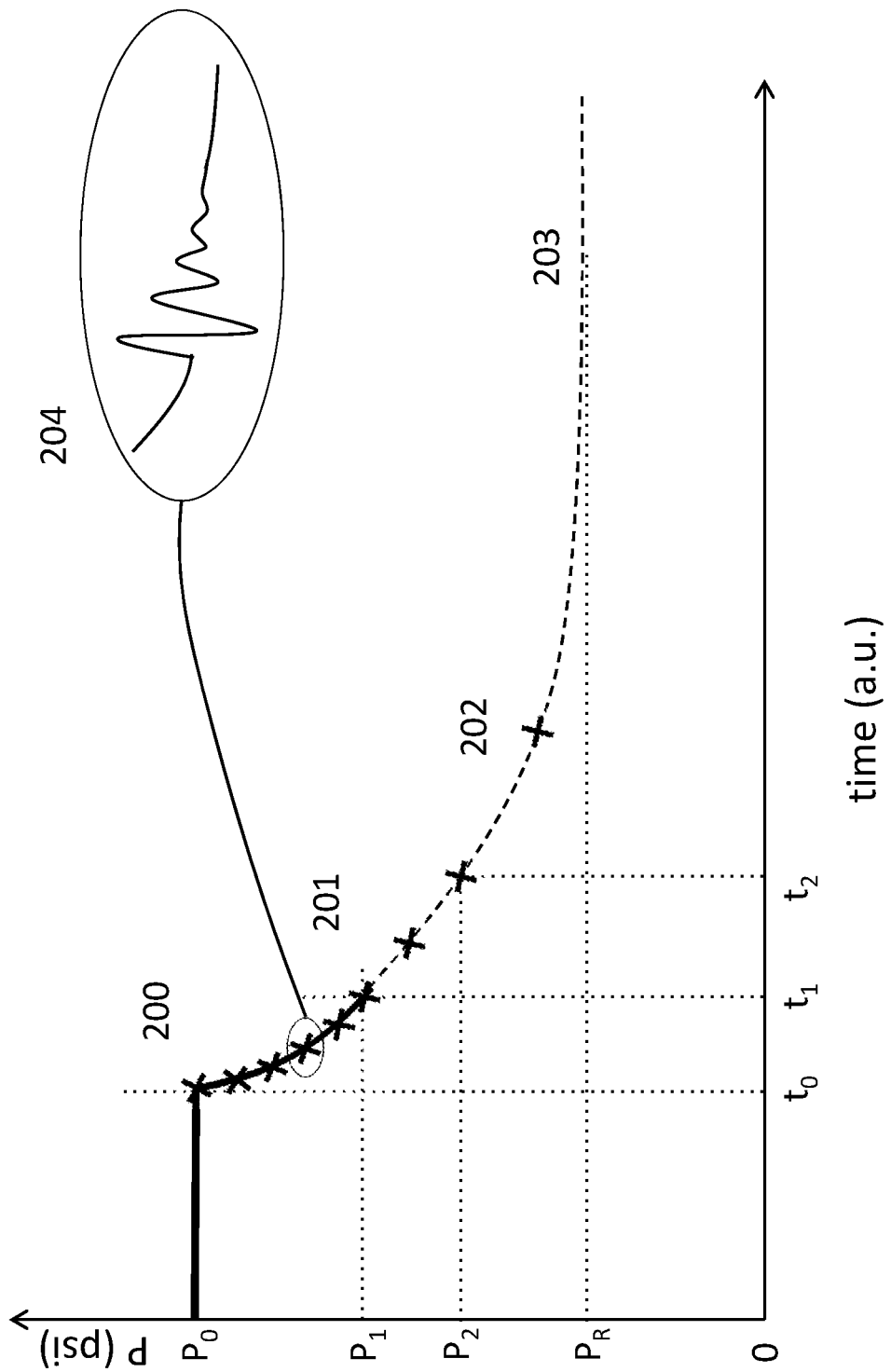
FIG. 2 illustrates an example pressure graph during a diagnostic fracture injection test, typical analysis, and exemplary measurement points. At point, water hammer of various strengths due to pump shutdown can exist. A measurement pulse, with amplitude A, characteristic frequency f, relevant to this disclosure, is generated for example at each of the points marked with "x" between $t_0 \ldots t_1$.

FIG. 2 depicts a typical plot of pressure data acquired with respect to time (sometimes days) after an injection test injection has taken place, such test typically made at sufficient fluid flow rate and volume pumped as to propagate fracture(s) in the reservoir. At to the pumping of a well-defined volume of fluid into the formation stops and the well is isolated from any fluid entering or leaving it at the surface. Thus, any and all variation in pressure will be due to the interaction of the wellbore fluid with the formation. At point 200, a water hammer as described above (similar to 602 in FIG. 6) can take place as a result of pump shut off, and subsequently, the pressure measured at the surface starts decreasing as the formation absorbs the fluid pumped into the well. This water hammer generation event can be repeated several times for varying volumes of fluid and pressures over time. For a typical DFIT, pressure is measured and a plot of the measured pressure with respect to time may resemble the one depicted. From the measured pressure $P_1$ at $t_1$ (shown at 201), the shape of the pressure/time curve can be extrapolated to yield various formation parameters, using DFIT analysis known in the art, for example, as described in the references listed at the end of this disclosure:

1. before closure (shut in) occurs, using (e.g., G-function, closure, or permeability analysis) (Nolte, Castillo, Baree, Liu, McClure);
2. After closure (shut in) occurs (Gu, Abousleiman, Soliman); and
3. Using more recent curve fits and models as represented by, e.g., Craig et al.

Pressure drop, .steady-state, and G-function derivative analyses can provide estimates of hydraulic fracture closure stress, closure pressure, leak off-type identification, and pore pressure estimates. See, Craig, DFITPro, PETE648—Well testing; lecture handouts and notes, Denver, Colo., Apr. 19 2017.

The choice of a leak off model will affect results. Additional information can be used for log calibration See, Halliburton Testing & Subsea, Diagnostic Fracture Injection Tests (DFIT™) in Ultra Low Permeability Formations, 2012. Homer, log-log, G-function, radial flow, sqrt(t), and other plots can be used to invert the shut-in profile to determine closure pressure, reservoir permeability, and pore pressure.

Further, more classical analysis can yield a $P_2$, fracture closure pressure (202) at inflection points of the pressure curve, and a reservoir pressure $P_R$ (203) at its asymptote when the pressure stabilizes (this may take days and weeks and in practice is not always done but can be extrapolated accurately using this invention). All of the above and other methods that rely on the shape of a pressure curve can be called "classical" analysis procedures.

A method according to the present disclosure may take advantage of an active pressure pulse source to take measurements at various points of the DFIT pressure curve decay (FIG. 2) depicted by x, and shown in the inset of FIG. 2 in detail with the active source generated pulsed waveform (204) of amplitude A, period T, and frequency f.

To implement a method according to the present disclosure with respect to an injection test, a time series of at least pressure data is necessary. To help better invert acoustic signals to fracture width, a second set of sensor measurements, such as the time derivative of pressure, dp/dt, (e.g., from a hydrophone) may be desirable. Additionally, for modeling and response of a water hammer (generated, e.g., by changes in pumping rate sufficient to induce water hammer), flow rate/injection rate data may also be acquired. A novel aspect of a method according to present disclosure lies in the combined active pulse and water hammer inversion that can be used to estimate fracture width (or aperture), by the following relationship: fracture conductivity=fracture permeability*fracture width:

$$C = kw \rightarrow w = C/k \qquad [\text{eq. 1-1}]$$

Determining fracture conductivity from acoustic pulses, such as by inversion processing, then using the fracture conductivity C and holding/assuming k constant, a fracture width can be calculated from the fracture conductivity: $w = C/k_{const}$. An example embodiment of inversion processing to obtain is disclosed in U.S. Patent Application Publication No. 2018/0320514, but other methods of determining fracture width, for example with measurements made by downhole (in-wellbore) tools, may be possible. As a sidenote, in case of N-fractures and a fluid viscosity different that of water ($\mu=1$ cp), the more general relationship is: $C = Nkw/\mu$. Thus a fracture aperture can be estimated and monitored with respect to pressure in real time during and after the fracture fluid injection. Such information can be used:

1. to estimate, using aperture changes as a function of pressure, the fracture closure pressure;
2. to compute, using the slope of a plot of aperture with respect to pressure, elastic and/or other properties of interest of the formation being fractured (these properties will affect fracture compliance). The fracture compliance depends on elastic properties of the formation and also on the dimensions of the fracture. This is depicted and described with reference to FIG. 5 at 502.
3. along with utilizing the fracture aperture (width) values, to provide estimates of fracture area from total volume pumped and/or effective volume; PKN, radial, or other models (in case of small DFIT-induced fracs, where they may not be confined in height), for fracture width vs. length and net pressure could be used to provide constraints on this and other extracted values; and
4. using the above results, to construct and project forward in time a model for the fracture and reservoir behavior including leak-off, to allow additional constraints on estimates of fracture length with respect to volume, fluid efficiency, reservoir pressure, and permeability.

Figure 3:
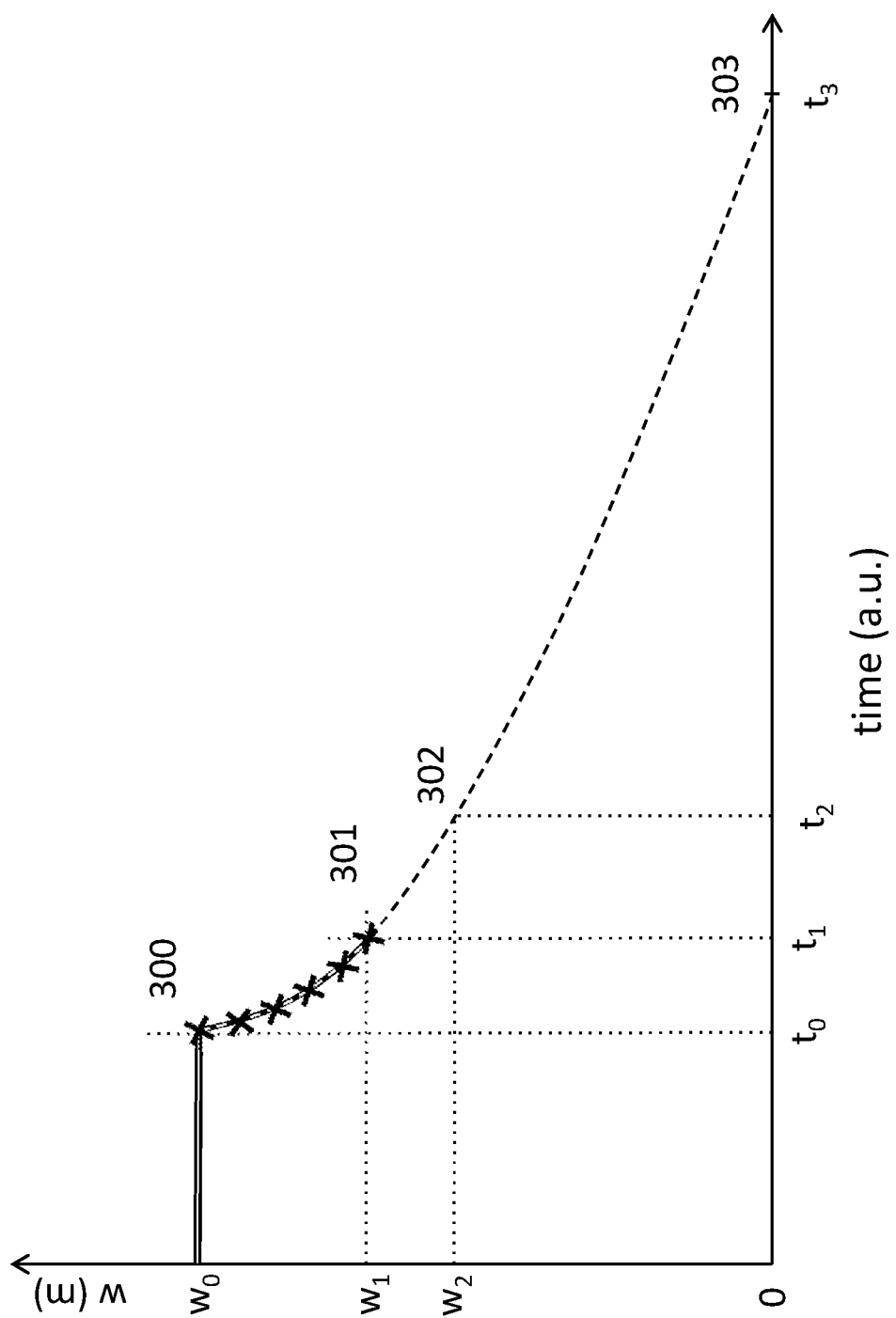
FIG. 3 illustrates an example of calculated fracture widths w, at points between $t_0 \ldots t_1$ corresponding to FIG. 2. The data trend is further interpolated using a model fit.
Figure 4:
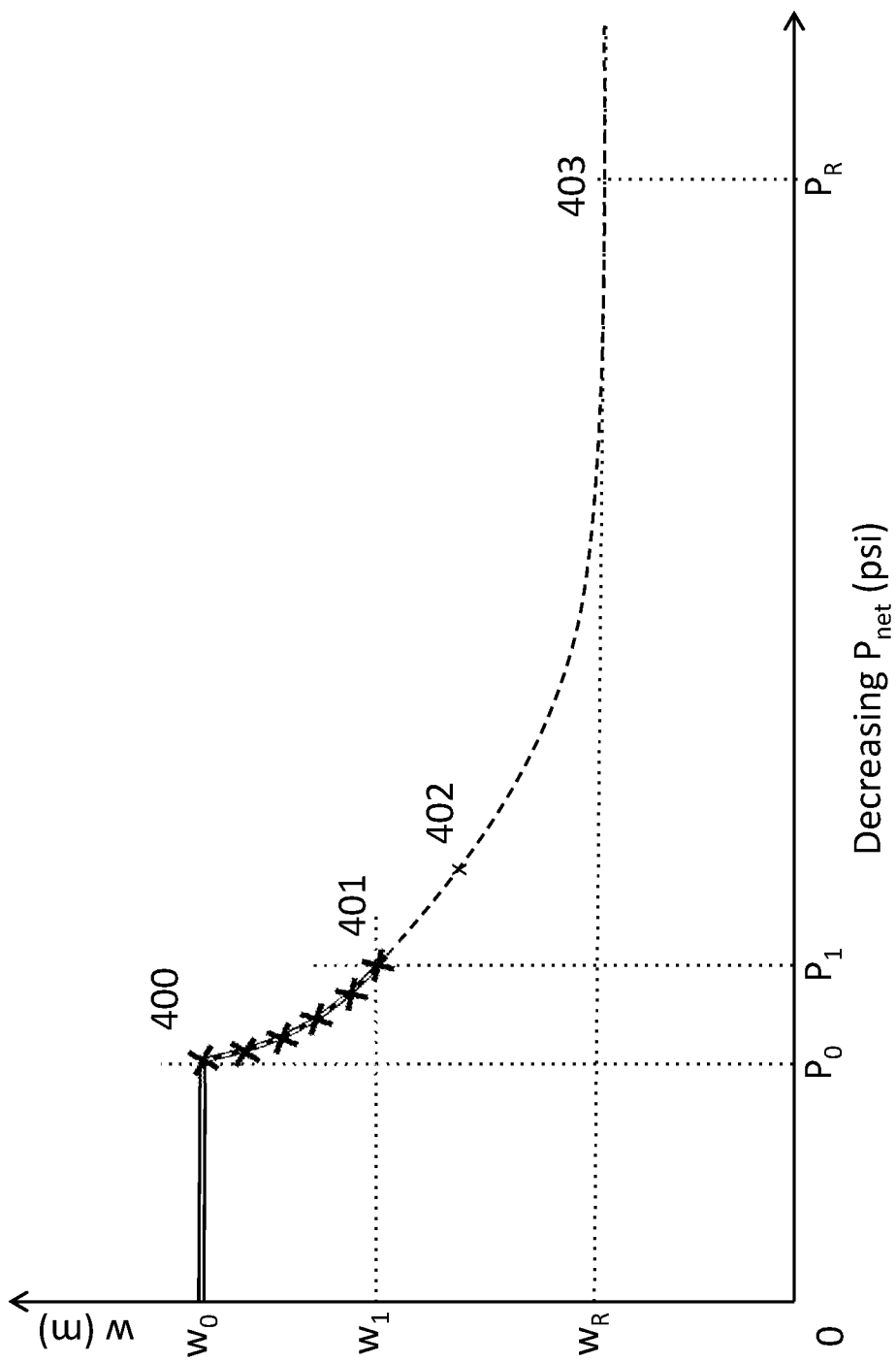
FIG. 4 shows an exemplary analysis and interpolation of fracture properties, in particular considering that a proppant maintains the fracture open. Net pressure is the excess pressure of the fluid in the fracture above the fracture closure pressure; width will decrease more slowly after fracture walls touch.

FIG. 3 shows an example of estimated fracture widths with respect to time using methods according to this disclosure, at points corresponding to those shown in FIG. 2. At point 300, the initial width wo of the fracture begins to decrease with time. The rate of change in the fracture width falloff decreases, at 301, to almost to a steady rate beyond point 302, to the end of the measurements, where, if no proppant was pumped, the fracture will completely close, at 303. The data trend may be further interpolated using a model fit. FIG. 4 shows an example analysis and interpolation by a dashed line of fracture properties, in particular considering a proppant jolts the fracture open at some residual $w_R$. Net pressure is the excess pressure of the fluid in the fracture above the fracture closure pressure; fracture width will decrease more slowly after the fracture walls touch. The point, 400, is the initial width before net pressure begins to drop at the shut in event. The point 401 is the turning point the decay rate in fracture width and a presumed end of the measurement. The point 402 indicates the fracture width at the closure pressure while point 403 indicates the fracture width at the reservoir pressure where $w_R$ is the residual fracture width for a given proppant. Note that horizontal axis is decreasing to the right, i.e., $P_0 > P_1 > P_R$.

Figure 5:
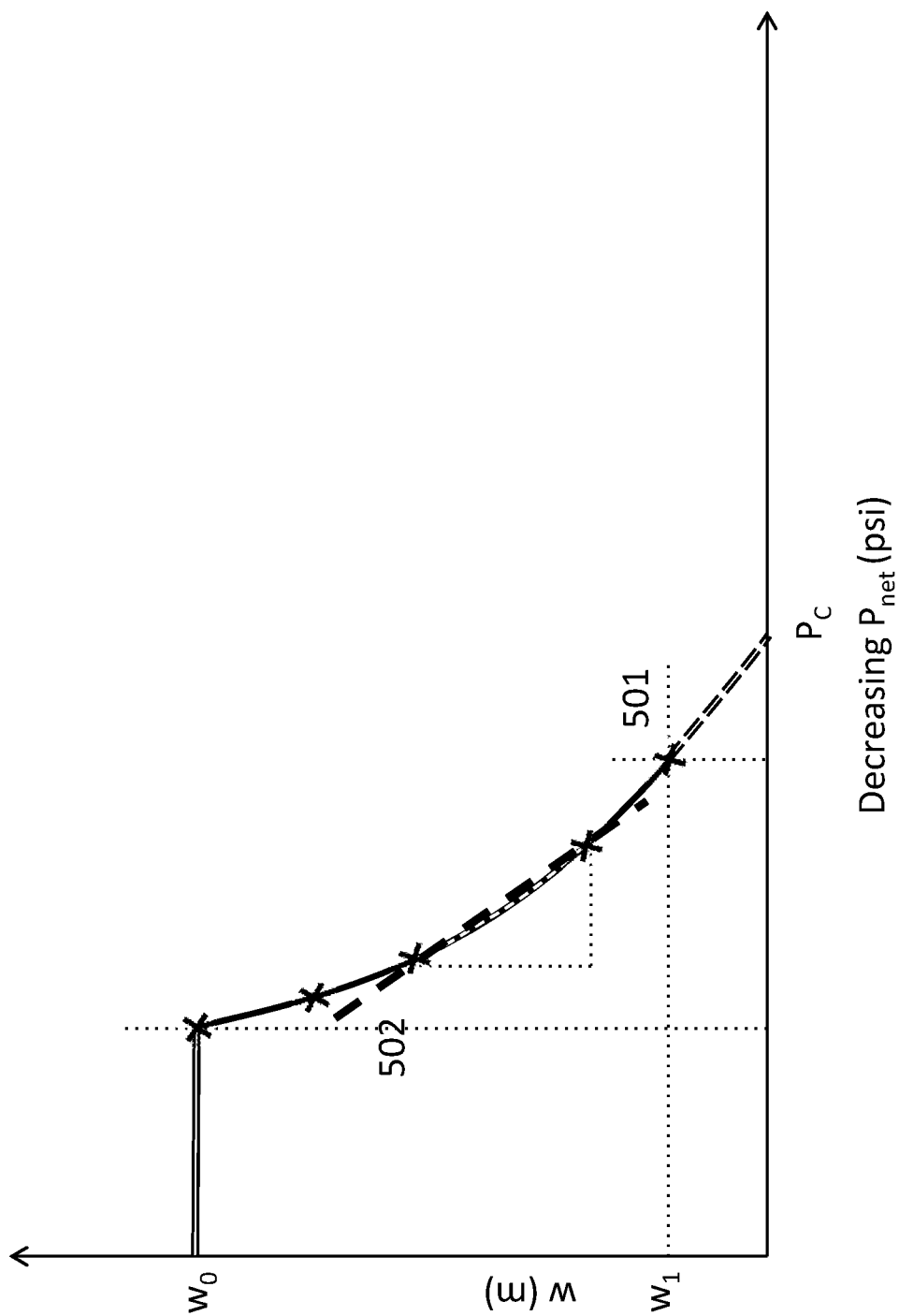
FIG. 5 depicts a closer look at fracture width as a function of pressure and a possible analysis for fracture compliance. Positive net pressure ($P_{net}$) is related to decreasing surface pressure. Slope shows estimated fracture compliance.

FIG. 5 illustrates the slope 502 (dashed curve) between the measured initial width at the pressure fallout and the turning point, 501. Slope 502 can be interpreted as fracture compliance. Note that the horizontal axis is decreasing to the right, i.e., $P_0 > P_1 > P_R$. Closure pressure, $P_c$, can again be interpolated by following through the linear trend of the curve after 501.

Figure 6:
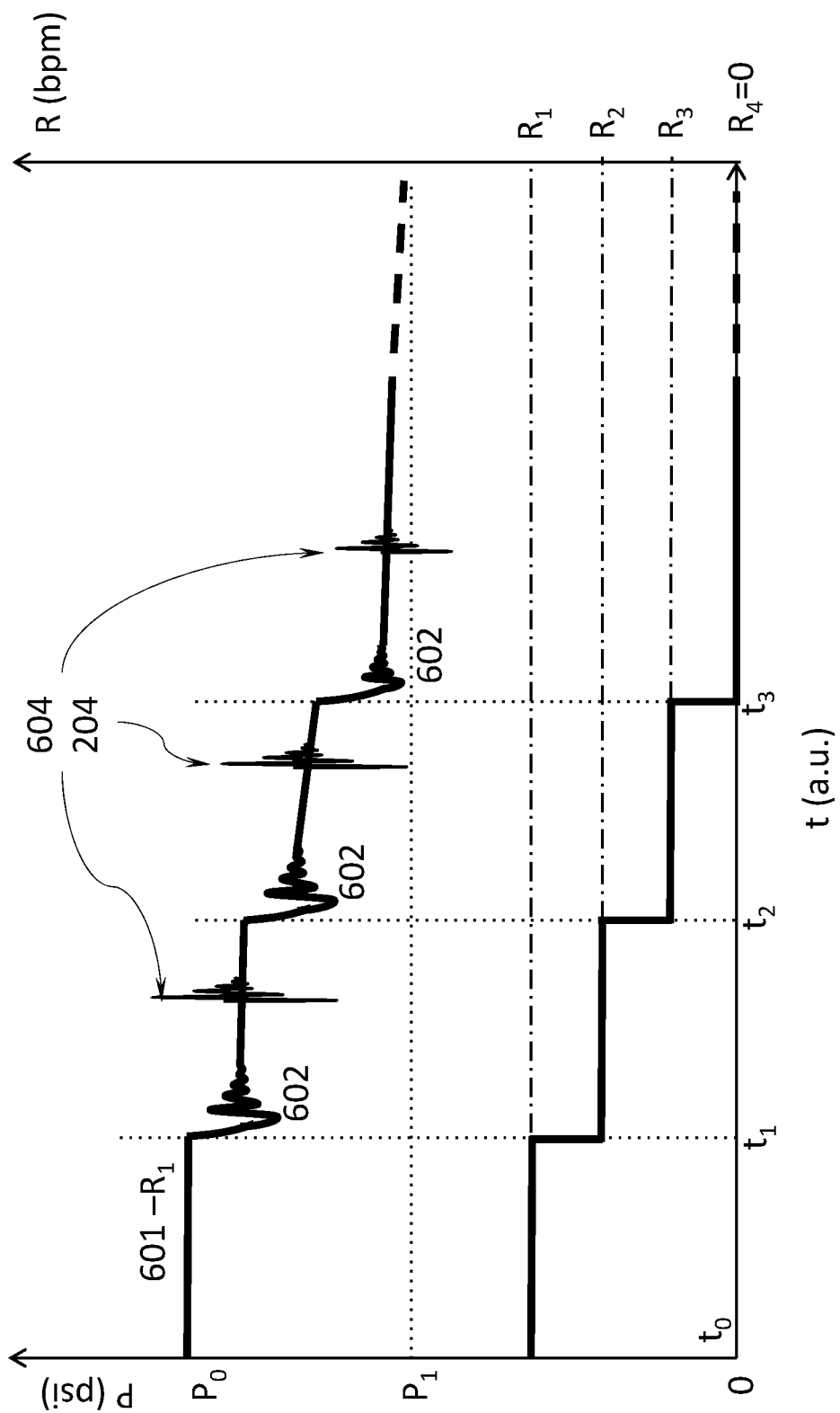
FIG. 6 shows an example of a step-down test with both induced water hammers due to rate step, and active pulses highlighted.

Referring to FIG. 6, an example graph of a step rate (step-down) test is shown, where water hammer measurement (204=604) is repeated several times for varying volumes of fluid 602, at different fluid flow rates $R_1$ through $R_4$ as at 601. Rates are indicated on the secondary vertical axis, not to scale with an arbitrary time scale on the horizontal axis, as the step rate tests can be performed over a time scale of minutes. Water hammer, shown in the pressure curve at 604, may be used to determine fracture width at any given rate change, where such rate change causes water hammer.

Figure 8A:
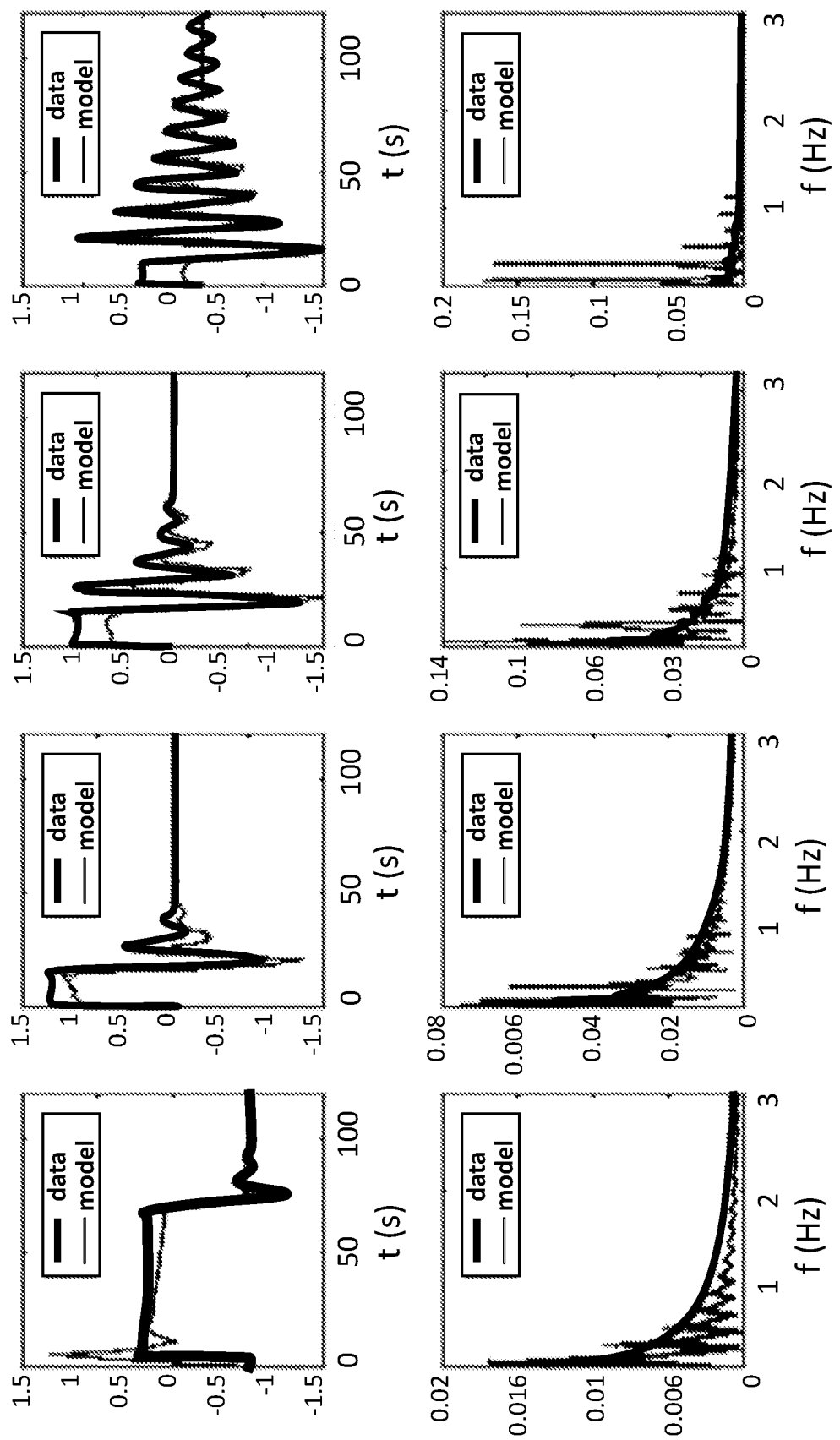
FIG. 8a-b show a fit and the same step down test data optimally fitted to a model to determine fracture width (w), near-wellbore friction coefficient (f), and perforation friction ($c_1$). Fracture pressure is calculated at t=5 min, the end of time window. Other sets of coefficients exhibit poor fit.
Figure 8B:
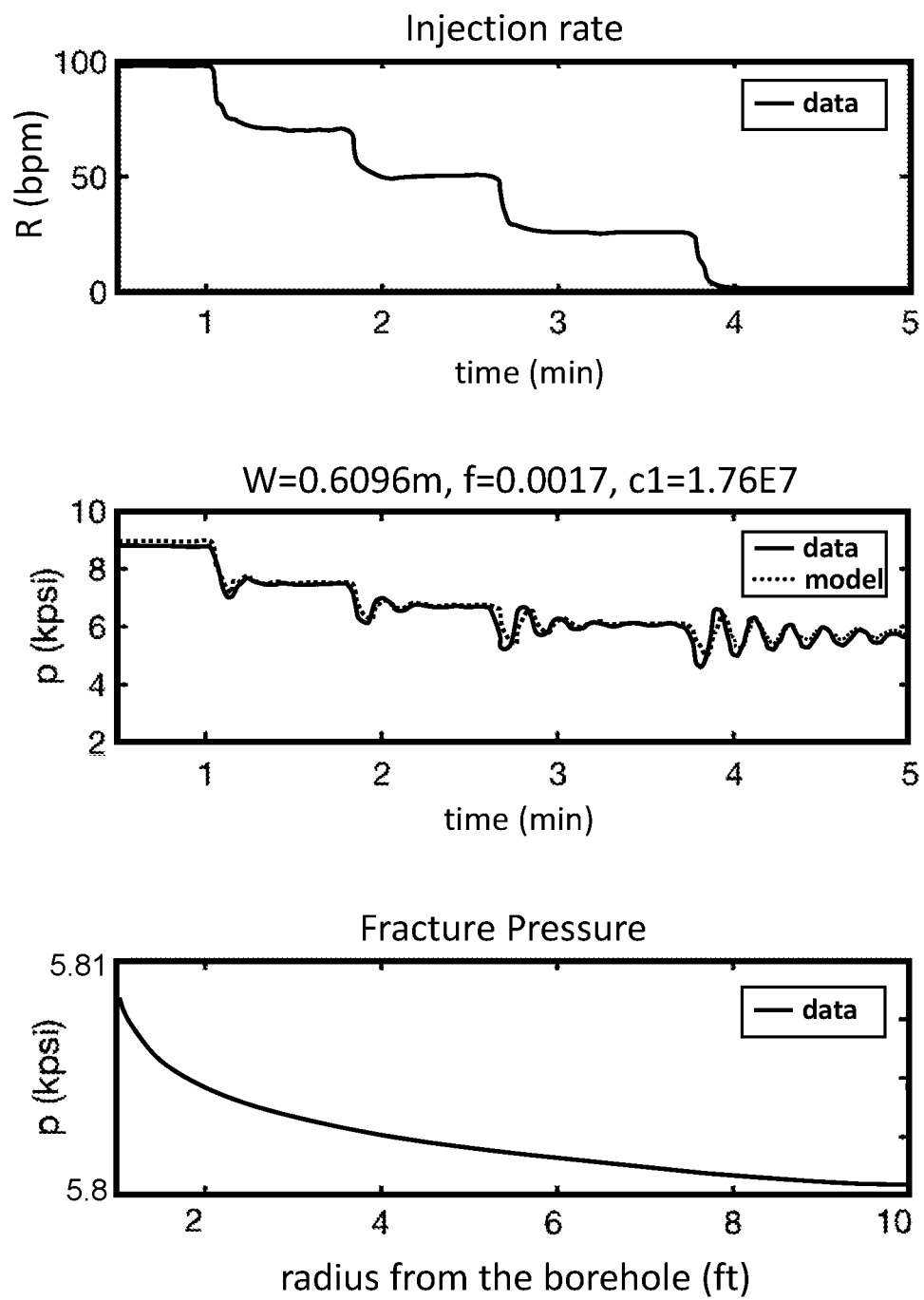
Figure 9:
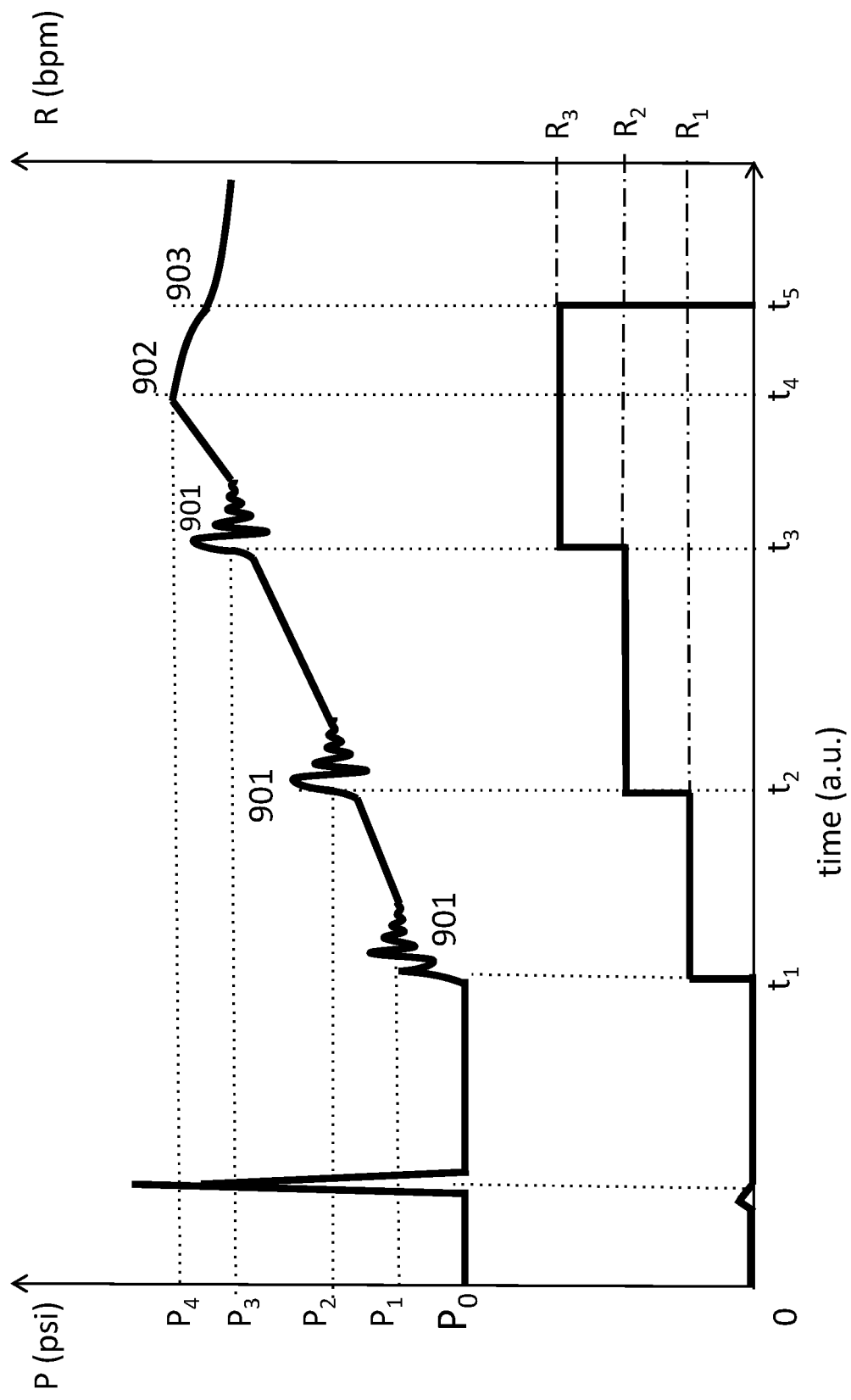
FIG. 9 shows an example of pressure and flow rate readings at the beginning of fracturing or during a step rate (up) test. The measurements include (and highlight) water hammer generated by the change in flow rate. Not to scale. Step up and step rate tests are relevant and applicable once a fracture has been created (after $t_1$).

Aperture changes can also be computed by inversion processing pressure measurements resulting from a water hammer typically present at pump shut-down as shown in FIGS. 8a and 8b. Bottom graph in FIG. 8b is the fitted bottom hole pressure and fracture pressure as a function of distance from the wellbore. A step-up rate change test example is shown in FIG. 9 where water hammer repeats several times for varying volumes of fluid 901 at the different flow rates. Another water hammer, generating tube waves in between pump water hammer points 901, can be inverted to obtain fracture parameters. The water hammer may be created by other well-known means, e.g., adding or removing a small amount of fluid to the wellbore, or opening and closing a valve. An example model that can be used for this inversion is that of Dunham et al. (Dunham et al. SEG, 2017, and again in previously cited U.S. Patent Application Publication No. 2018/0320514), in some cases to get more crude estimations, a hydraulic impedance model (Holzhausen 1986, etc.) can be used as well, by neglecting some physics). Steady-state diffusion model, or other models, including wave-guide, Krauklis-wave propagation models may also be used. Other inversion models are possible (e.g., including other realistic and relevant physics in the model of Dunham et al., SEG 2017). A particular choice of a model is not meant to limit the use and application of methods according to the present disclosure.

Importantly, given that DFITs utilize very low fluid volumes, fracture lengths are short enough that it is possible to measure effective fracture length by inverting the coupled response of the wellbore and fracture to appropriate pulsed pressure waves. For example, 1 barrel (bbl) of fluid spread over a ¾" wide even fracture covers approximately 90 sq. ft. For illustration purposes, 10 bbls of pumped fluid would initially (assuming slow leak off) create a rectangular volume ¾ inches wide and of approximately 900 square feet. Fractures, while not rectangular in cross-section, have shapes (elliptical, triangular, wing, etc.) for which known results allow computation of aperture, radius, and volume from the internal pressure in the fracture.

An example embodiment of a method according to the disclosure will be explained with reference to FIG. 10. To implement the Dynamic DFIT measurements according to the present disclosure, an injection of a known, small amount of fluid into the wellbore is required.

This is typically performed as part of well-known in the industry DFIT analysis, also referred to as a "mini-frac." DFIT (injection test) and mini-frac may be used interchangeably. These tests are used to evaluate properties of a subsurface formation by measuring pressure behavior after injection. Variations of mini-frac tests use several consecutive injections of a volume of a fluid, typically done at constant rates (e.g., 50 bbl at 5 BPM, followed by 50 bbl at 5 BPM and finally 100 bbl at 5 BPM) designed to match the formation, but for the purposes of description, only a single injection may be considered. The method can be applied to multiple consecutive injections into the wellbore.

At 1010, a fluid injection test is performed. No proppant may be used and only fresh water may be pumped into a wellbore by a single pump. The wellbore may be one designed and/or drilled specifically for the purpose of such tests, or a horizontal wellbore may be drilled to be later fractured, typically having a limited number, e.g., one cluster of perforations and contacting the formation of interest, i.e., a hydrocarbon bearing formation. Further, with known fracture width w and volume of pumped fluid, any assumptions, for example, a wing-fracture geometry of PKN—can be used to constrain the geometry of the fracture and its change over time the width and volume of initially injected fluid. Based on reservoir rock, other informed assumptions may be made, such as parallel plate fracture, elliptical or circular fracture.

By extrapolating fracture width trend (FIG. 5), a fracture closure pressure, Pc (w=0, or an inflection point in width measurement—Ref. McClure) can be determined.

Based on the behavior and trends of fracture width and pressure, a proper leak off, or pressure-dependent leak off (Castilo 1987, Liu 2016) model can be selected.

At 1020, fluid pressure and fluid pressure time gradient (dp/dt, e.g., from a hydrophone) measurements are made during the fluid pumping and throughout the remainder of the procedure. Sensors may be placed at or near the wellbore such that they remain in hydraulic conductivity with the wellbore fluid. A good sensor location may be right on the well tree with a large, unobstructed flow path to the well. FIG. 1 shows an illustrative example of sensor arrangement.

At 1030, water hammer generated by shut down of the pump may generate tube waves that reflect up and down the wellbore. The signature of the tube waves in the pressure and pressure time derivative signals are identified. Detecting and identifying tube wave signatures from water hammer is optional and can inform the procedure and data but it is not essential; the acquired data will be used and inverted to width identically, as described at 1050.

At 1040, ideally taken as soon as possible after the pump shut down and once any water hammer generated by the pump shut down has attenuated, an "active source" is used to generate a controlled pressure pulse in the wellbore. The controlled pressure pulse should have suitable pressure/time characteristics to generate tube waves, the response of which are detected by the sensors, recorded and then analyzed. An example of an "active source" is a piston-like device hydraulically connected to the wellbore fluid column that temporarily moves in or out a small amount of fluid. Other types of "active sources" can be opening and closing of a valve, for example or starting and stopping a pump. A well-controlled source should have defined and repeatable motion and pressure pulse generation.

The pressure pulse generated by the active source, traveling as a tube-wave, will propagate along the wellbore and reflect, often multiple times,-back from the well bottom and from the connected formation to the surface, where the measurements take place.

At 1050, the frequency spectrum and other pulse characteristics and changes of the foregoing within the reflected tube waves can be inverted into a quantity representing a conductivity of the fracture(s), as is described in U.S. Patent Application Publication No. 2017/15810817. Moreover, the reflected tube wave characteristics can also be used to estimate fracture width and/or conductivity. A simple frequency match can be most expedient, but other models and other ways of estimating fracture width from reflected tube wave characteristics are known in the art. Such pulsing and measurement of pressure response, and using the response to determine fracture width and/or conductivity may be repeated a plurality of times at various pressures after the pump shut down. Thus, measurements corresponding to fracture width and/or conductivity may be made at various fluid pressures in order to characterize the fracture behavior with respect to pressure.

At 1060, plots of fracture width (and/or conductivity) as a function of both time and pressure can be generated. Examples of such plots are shown in FIGS. 2, 3, 4, and 5. FIG. 2 is a pressure with respect to time plot, known to be used for a "mini-frac" analysis. Points "X" indicate active pulse determined (e.g., by inversion) fracture width. FIG. 3 shows fracture width with respect to time on such plot with "X" marking the reflected pulse measurements and decreasing fracture widths over time, eventually leading to w=0, and a closed fracture at time $t_3$. FIG. 4 shows decreasing fracture width with respect to measured net pressure (surface pressure less hydrostatic pressure in the wellbore).

At 1070, the injection and measurements performed as explained with reference to 1010 through 1060 may be repeated to obtain at a set of plots and fracture width behavior over time (and/or as a function of pressure) at various conditions of the fracture and reservoir.

At 1080, additional fluid injections and pressure (and pressure time derivative) measurements can be performed to investigate fracture behavior at larger volumes, fracture widths, and overall larger fracture extents.

At 1090, the fracture compliance given measured parameter can be arrived at as a slope of width decrease as a function on pressure.

At 1100, any curve (e.g., as shown in FIGS. 2, 3, 4 and 5) over time can be extrapolated and fitted to project expected future values of fracture width, fracture conductivity, fluid pressure, or a relationship between fluid pressure and fracture width. Assumptions, for example the fracture geometry: a wing-fracture, parallel plate fracture, elliptical or circular fracture, and so on can be used to constrain the geometry and its change by knowing the width and volume of initially injected fluid.

At 1110, ultimately the information about fracture behavior (e.g., pressure with respect to width) determined during the testing at 1010 to 1090 may be scaled and used to design a better and more effective fracture treatment(s).

Autocorrelation to Investigate Wellbore and Fracture Condition

Figure 11A:
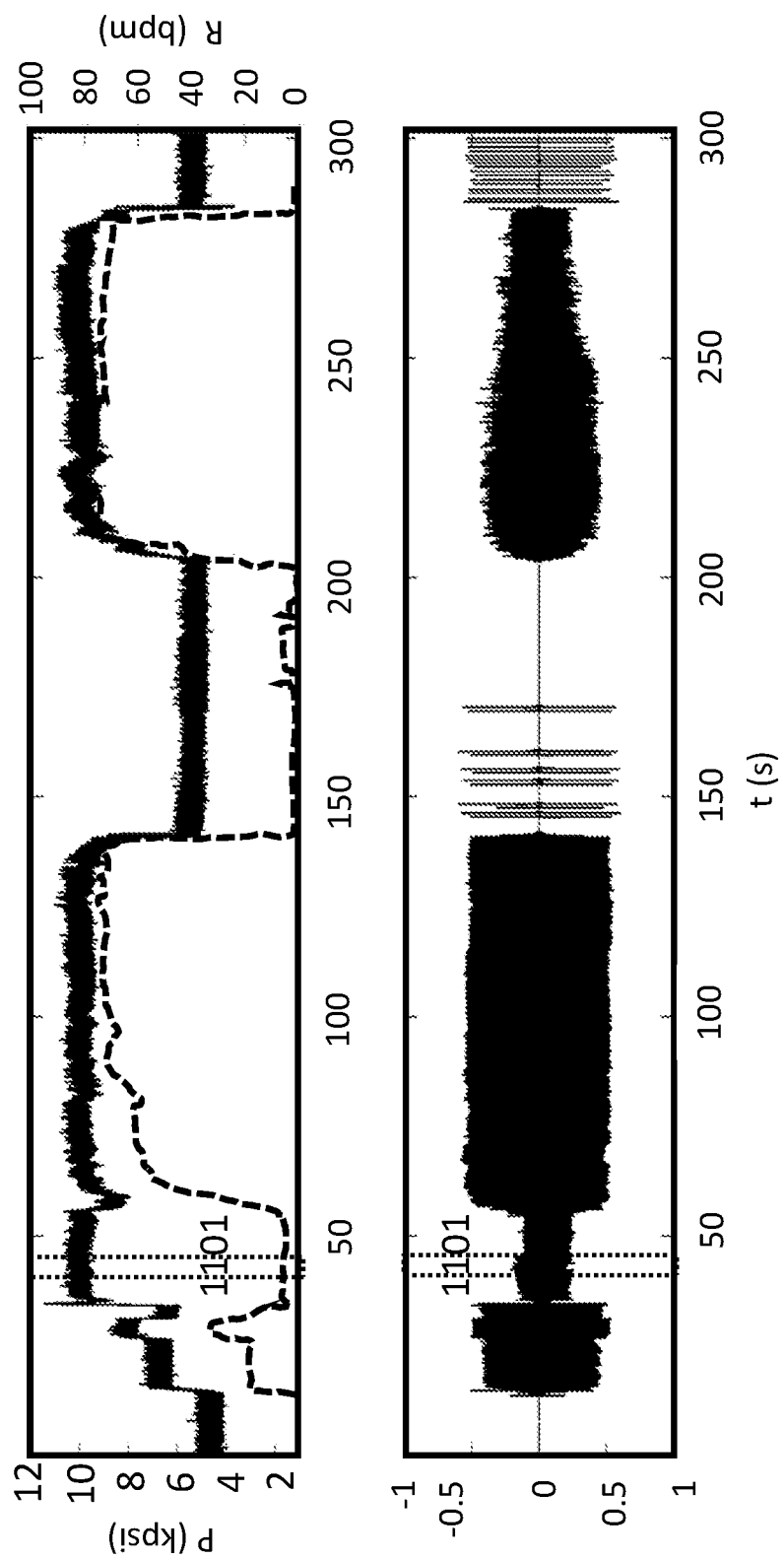
FIGS. 11a-h show graphically how a pulse can be extracted from noisy data using autocorrelation function and various applications. Flowrate in FIG. 11a is dashed.
Figure 11B:
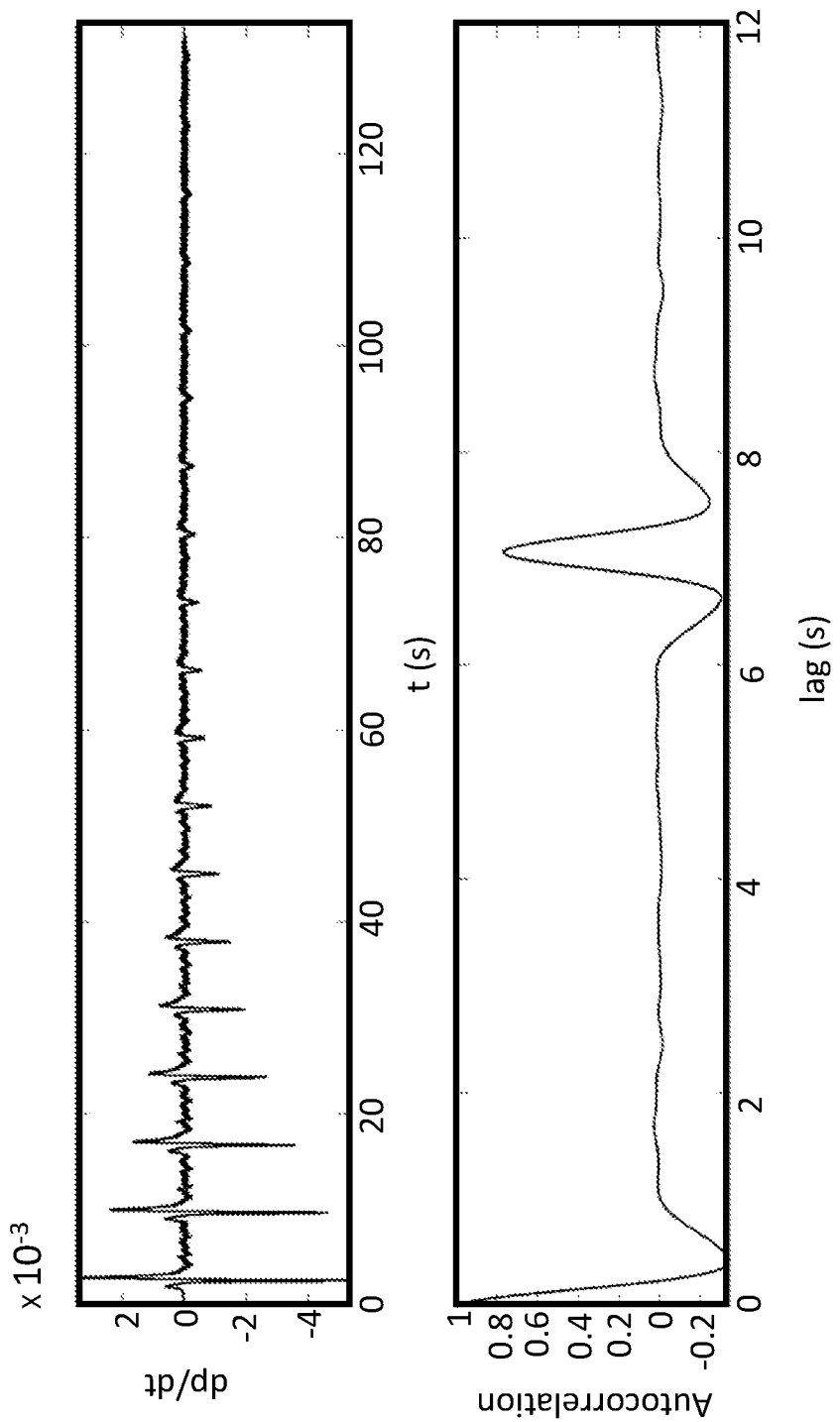
Figure 11C:
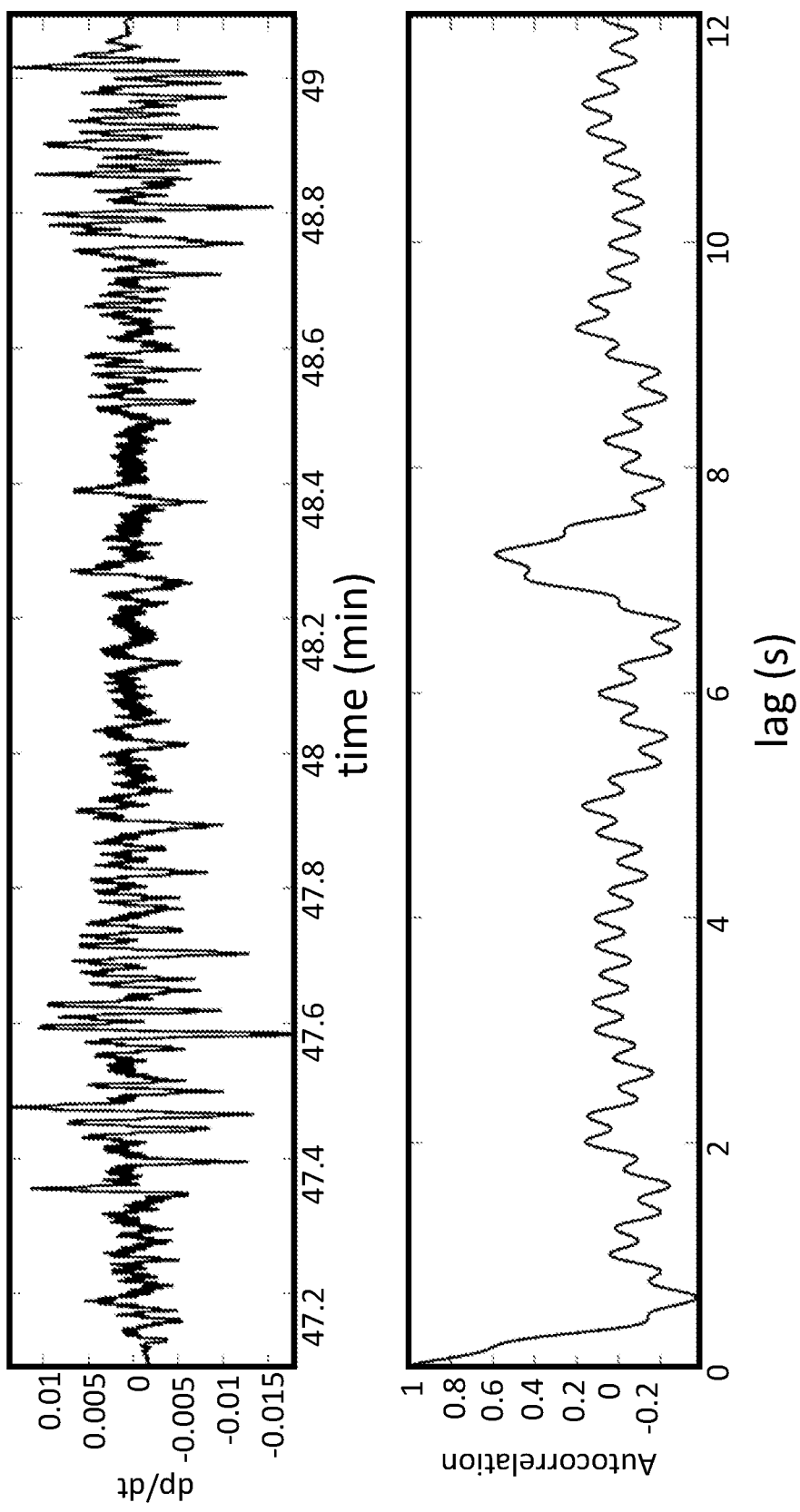
Figure 11D:
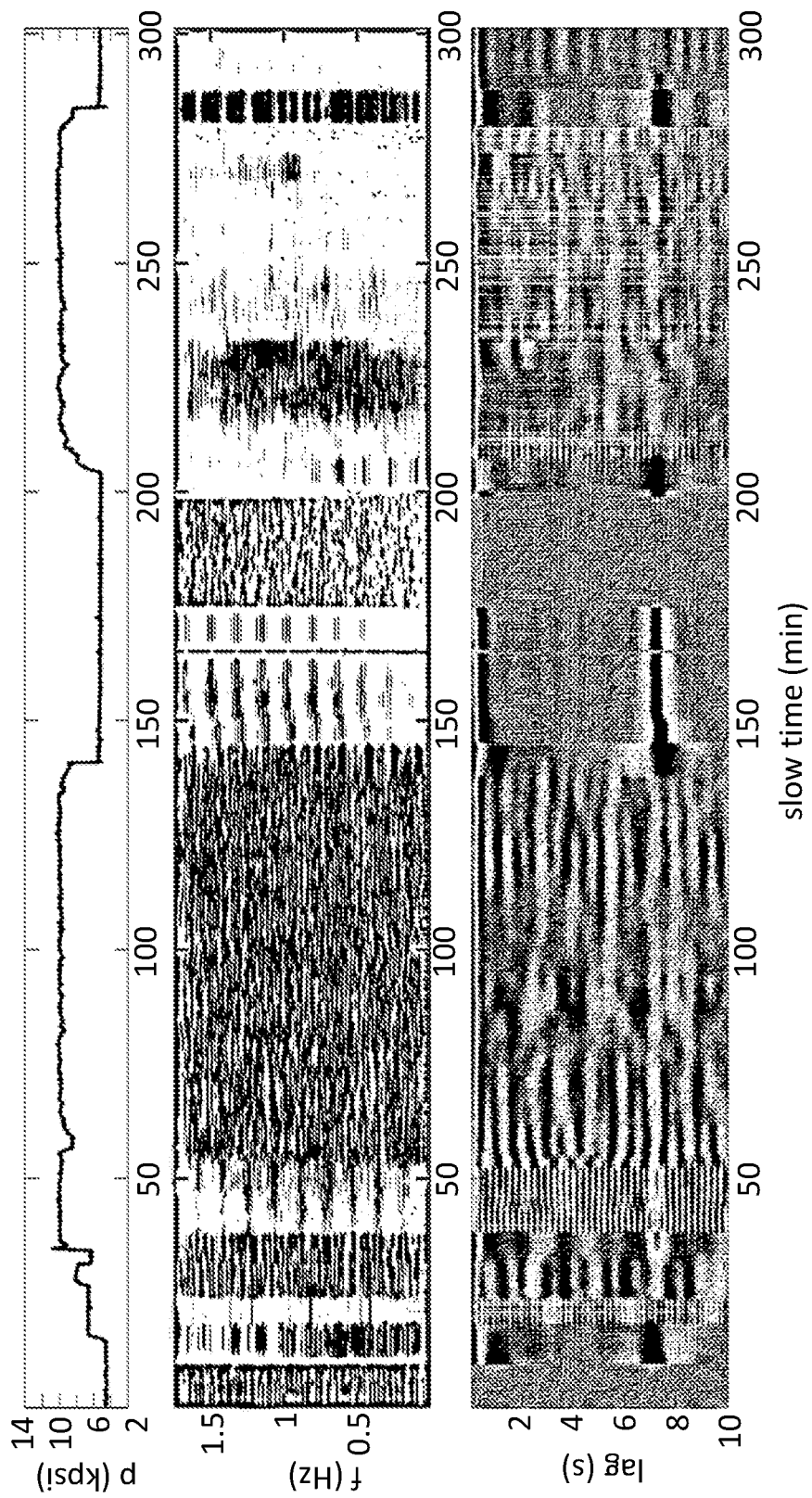
Figure 11E:
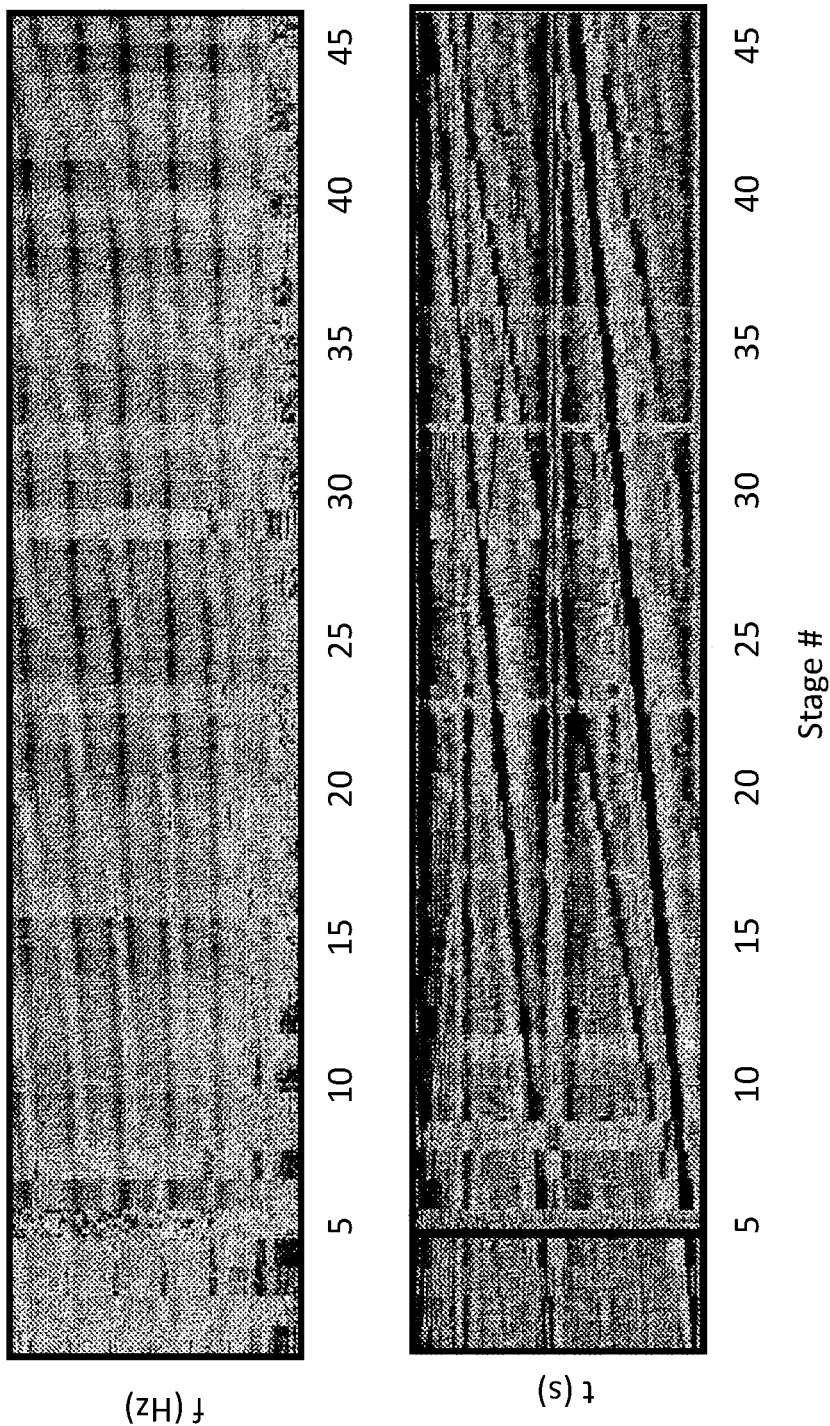

Aperture changes while pumping can also be extracted by using a pulse or frequency-modulated source to extract the signal from noisy data, or using an autocorrelation-function (FIGS. 11a-h) to decouple noise and pseudo-source reflections from the wellbore bottom & features. FIG. 11a shows a typical noisy data recorded on a pressure and hydrophone at the surface of a well during a fracturing treatment (note that the pumping rate R (in barrels per minute, BPM) is recorded as well in dashed line. FIG. 11b depicts the autocorrelation function computed in a highlighted area 1101 of FIG. 11a, about 48 minutes from start. Notice the peaks at typical travel times of a tube wave for a given depth. Those show reflection from the plug bottom. Also, note how "clean" and coherent the autocorrelation signal is in comparison with the raw pressure or hydrophone data during the interval. This would be the source signal extracted from noisy data. FIG. 11c. shows the autocorrelogram of a section of noisy data revealing the same peak in reflection travel-time, recovered from that noisy data in the absence of a created pressure signal. FIG. 11d. shows a different representation of the autocorrelogram showing how the identified signal changes with time during main injection stage of a hydraulic fracturing operation. A pattern of various time lags is clear in the lower graph. FIG. 11e. shows both a spectrogram and corresponding autocorrelogram across 46 fracture stages in a horizontal well. Dominant lines are apparent, as a result of the autocorrelation function and related spectral analysis clearing up noisy data.

The autocorrelogram in FIG. 11e, the top graph, shows systematic changes in the spectrogram of noisy data revealing well-defined changes from stage to stage of hydraulic fracturing depicted and identified by various lines. In FIG. 11e, bottom graph, the autocorrelogram lag can be used to deconstruct and follow in real-time an active pulse travel time and behavior during pumping of multiple stages. Thus the need for an active pulse is diminished. By controlling the changes in flow rate, stronger water hammers, and possibly stronger, coherent lag signals can be generated. This can be accomplished for example, by cycling, pulsing, or synchronizing pumps performing the treatment.

Figure 11F:
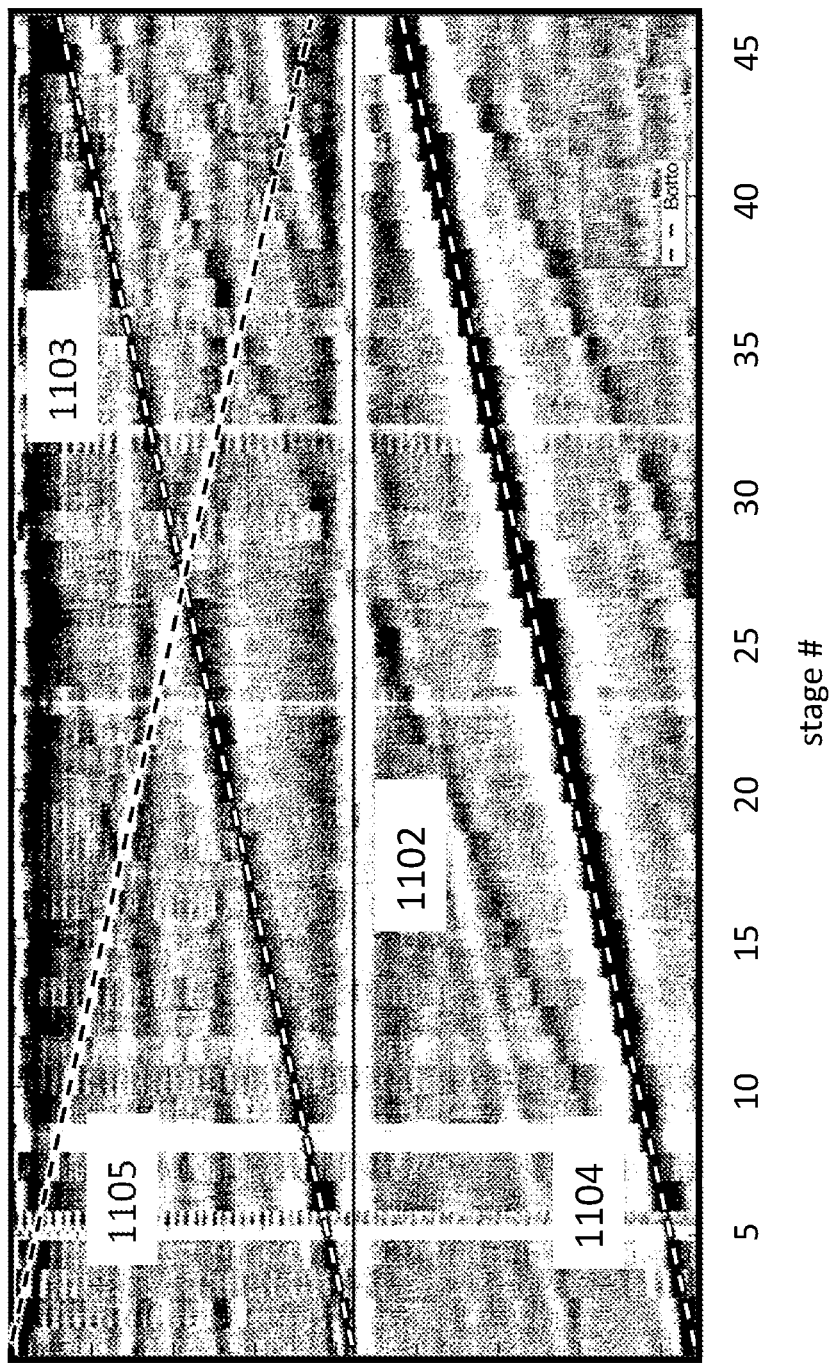

FIG. 11f illustrates an example of the autocorrelogram of a well over all fracture stages; it shows dominant features where Autocorrelation recovers pulse signal from noisy data such as reflections (and thus tube wave velocity) from intermediate casing, 1102—horizontal line in the middle, production casing, 1103, upper diagonal white-dashed line, plug, 1104—lower diagonal white-dashed line, and bottom to plug, 1105—diagonal black dashed line starting in top right corner of the graph.

Figure 11G:
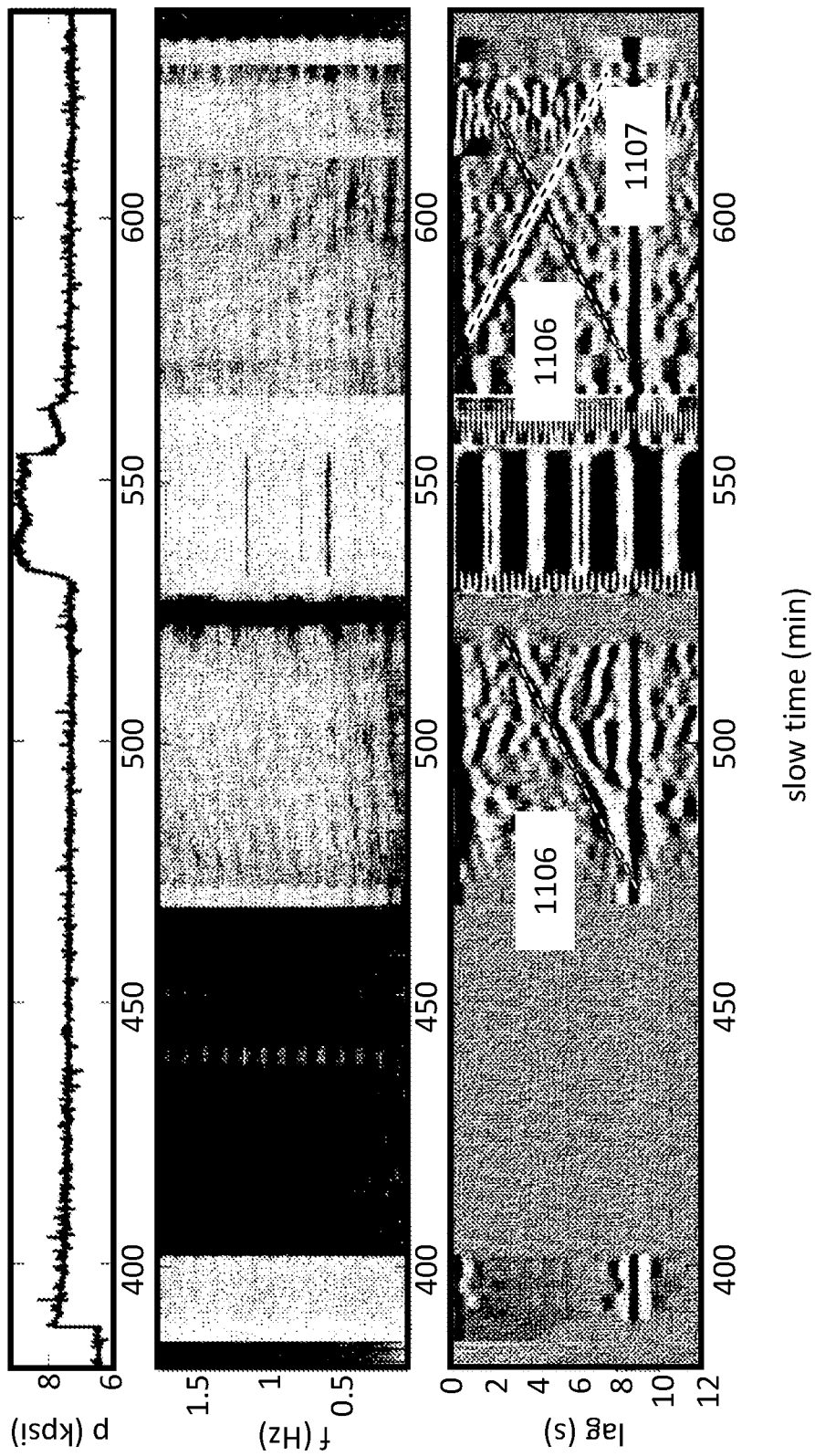

A zoom-in view of perforating gun down and up trips are shown in FIG. 11g. When the tool moves upward, 1106—white dashed line or downward, 1107—black dashed line detected by the autocorrelation as the reverberation between tool and plug. 1106 also shows the reverberation between the front of the perf gun and the wellbore bottom or plug.

Figure 11H:
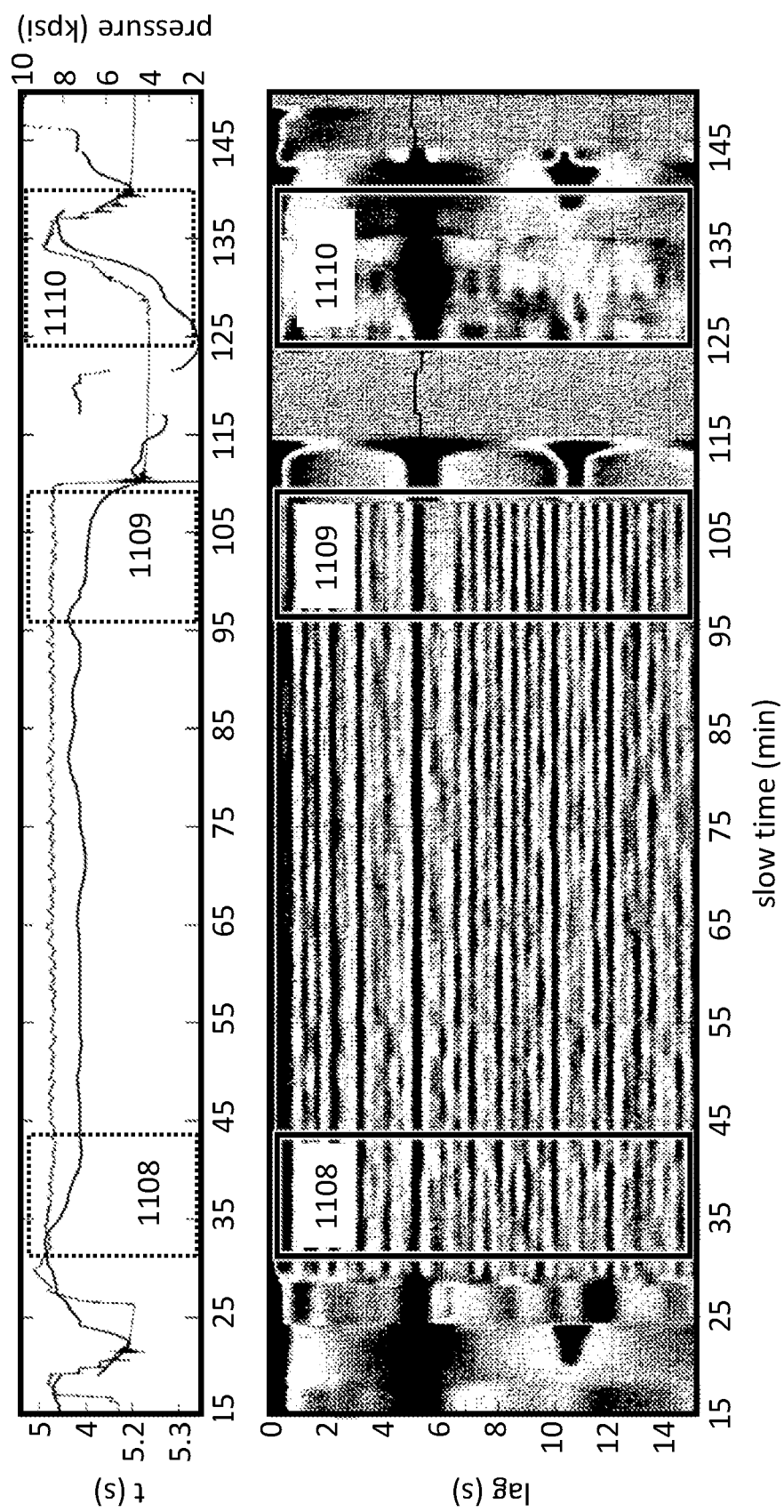

FIG. 11h shows other events in dotted and solid rectangles in the top and bottom portion of the graphs, respectively. This includes fracture growth, 1108, sand pilling up, 1109, and flushing of piled up sand, 1110, that can also be detected.

While pumping a hydraulic fracturing treatment, especially at high flow rates, it is difficult to generate a strong enough acoustic signal that reflects from the bottom of the wellbore and returns undistorted or uninhibited by background noise for analysis. A reflection from the wellbore bottom or other various wellbore features, however, can provide unique information. A change in such reflection over time may also provide information. Instead of an "active source" as described above, the general sum of pump noise is used as a "noisy source" and spectral techniques may be implemented to show the surface-reflection and resonances. This is depicted by FIGS. 11d-h. Tracing the autocorrelation (or other spectra) over time can help identify wireline motion plug locations or operational issues. An example implementation comprises:

1. Perform a well operation or well intervention during a hydraulic fracturing treatment. This may include, for example running wireline instrumentation, pumping of a treatment, plug setting, fluid flush of the well, casing perforation, pumping of diverter and other activities.
2. Acquire and record at least hydrophone (dP/dt) signals over time as x (t)—acquiring at least using acoustic frequency in a range of about 100 Hz to 20 kHz at a point in the well. The frequencies of interest, such as tube waves, ultimately analyzed may fall below 100 Hz, but a faster sampling allows for a more accurate waveform measurements. A preferred and convenient sensor location is at the surface as shown in FIG. 1., but the sensor can be placed in other locations, e.g., in the wellbore.
3. Process the incoming signals, filter if necessary, and plot the spectrum and autocorrelation in selected (e.g., ~60 to ~120 s) time windows. The time window affects the lowest frequency sampled, i.e., 128 s (convenient for fast Fourier transforms) time window will have $\frac{1}{128}$ Hz as the lowest recognizable frequency.
4. Transform input signal x(t) to spectrogram X2 (t,f), e.g., by a Short Time Fourier Transform. This allows for an easy visual representation of the data and time lag in the signal.
5. Analyze the initial shape, polarity, and characteristics of the autocorrelation plot. Such an event may be, for example, the reflection from the plug (FIG. 11). The event of interest may represent a peak or dip (positive and negative polarity respectively), or a shape of a peak/dip in the autocorrelation function.
6. Create the A (t, τ) plot by stacking in time (on horizontal axis) and window-averaging the autocorrelation functions in reasonable windows. Such a plot is depicted in FIG. 11d-f. An identified event such as reflection from the fractures or a plug, can be shown and tracked through time and location along the wellbore in the on the A (t, τ) plot (assuming tube wave speed remains approximately constant throughout the measurement).
7. Repeat and update the creation of the A (t, τ) plot in real time as the new data is captured. Observe changes.
8. Track at least one of the identified events, or overall shape, behavior of the autocorrelation curves and plots.
9. Flag any changes or departures from prior values of the autocorrelation as possible "events". Any changes of the autocorrelation function or the resonance plot can be flagged. These "events" are indicative of the wellbore-system changes. Several such examples are in FIG. 11. In particular, a change in polarity may indicate a plug opening or slipping.
10. Use the changes in autocorrelation to inform and adjust operational parameters. For example, a changing polarity of autocorrelation may indicate the wellbore bottom closing up, and an impending screen out. This may be avoided by reducing the rate and proppant concentration.

As an example, a well operator set a plug in a well casing and then pumped a drop ball to seal the plug. Prior to the plug sealing, the autocorrelation function at the reflected time arrivals from the plug (based on tube-wave speed) is negative (open boundary condition). Once the drop ball reached the plug, it properly sealed the plug, and thus the polarity of the autocorrelation function changed abruptly from negative to positive (closed boundary condition). Thus, a well operator can be assured that the plug seating was performed correctly and stage isolation is complete. Using the same technique, it may be possible to determine whether a plug has been displaced axially (moved) along the wellbore.

Changes in the autocorrelation function characteristics, for example narrowing or widening of peak, shift in time or polarity of such peak may indicate that the tracked "event" or its characteristic is changing. This may be explained, for example, as a plug opening, fractures closing, a foreign body in the wellbore, a movement of an object, among other features.

The data then, during a hydraulic fracturing operation, but also possible during a Mini Frac, are continuously recorded and analyzed in time-windows for spectra. Changes in the spectra and the autocorrelation peak shifts describe the wellbore condition as is demonstrated.

FIG. 11a shows a fracturing of a stage (with an operational disruption/shut down from about 140-200 minutes). FIG. 11b depicts an autocorrelation plot from a water hammer. FIG. 11c. depicts autocorrelation from a time region 1101 on FIG. 11a. FIG. 11f depicts a compressed spectrogram over all stages in a well. The noted lines on 11f show over stages 1-46:
Unchanging location of intermediate-to-production casing boundary, 1102,—because of known measured depth, this can be used for various calibrations,
casing boundary to plug reflection, 1103,
plug location reflection, 1104, and
plug to bottom reflection, 1105.

While FIG. 11g shows such changes over a stage in between stages while perforation gun is being lowered (1106) and extracted from the well (1107). This reduces the need for use of an active source.

FIG. 11h highlights other identified areas of the graph as fracture growth, 1108, sand pile-up, 1109, and sand flush, 1110.

A process to utilize the above method is to measure the autocorrelation, monitor, and search/track for abnormalities or unexpected operational issues in any of the quantities above. In addition, the autocorrelation could be inverted to near-field fracture properties in near-real time. Additionally, the use of synchronized pumps to generate coherent source pulse(s) is disclosed.

Note, that pattern recognition software and various neural network/learning/AI algorithms can be used on such data to visually identify outliers, problematic situations, and/or to follow the fracturing treatment progress and quality.

Example of Dynamic Step Rate Analysis Using a Method According to the Disclosure The disclosed analysis may be carried out with active (forced water hammer) and passive (noise generated by a pumping operation) data or as a step rate test prior to shutting in the well and using active pulses after shut in, as the pumps would have been turned off at that point. A representative step rate injection analysis is provided in FIGS. 7, 8, 9, 11. The analysis was performed on a dataset from a hydraulic fracturing of a well. The computed parameters chosen by algorithms using the described analysis represent both realistic, and a unique set that fits the data—demonstrating both the method and the uniqueness of the inversion.

Data Used in the Method

In one embodiment, a dynamic step rate analysis, requires only pressure data to be acquired and a well-known construction schematic of the well (wellbore geometry diagram). The pressure data should be acquired at sufficient frequency and precision to allow for a good fit (approximately 100 samples/second) as should any pressure time derivative (hydrophone) or similar acoustic data.

In case of a step-rate test, or more other implementations, it is desirable to enrich the data acquired by flow rate changes. This allows one to perform measurements when flow rate changes.

Passive data (pressure, rate, and hydrophone—dp/dt) provide a means to monitor resonances in the well, from which modeling may also allow inversion of fracture properties. It also allows for inversion to a source pulse as described in this disclosure. Data must be collected before, during and after the step-rate is pumped and as the wellbore is prepared for the test (including, prior to and following plug setting or shooting perforations). This is to ensure that conditions in the well known to cause changes in the recorded data are properly accounted for avoiding contaminating the interpreted results.

Dynamic Step Rate and Step Down Test Analysis

Step rate (represented by FIG. 9) tests take place after formation breakdown and are carried out during hydraulic fracturing operations for several reasons. They can be performed by increasing—but most often decreasing flow rate through a series of steps (e.g., 40 BPM, 60 BPM, 80 BPM).

Each flow rate is maintained until the pressure stabilizes. At 902, it may be observed that the formation starts breaking down and fractures propagate, while after 903, the fractures are established and continue to grow with smaller resistance (lower pressure); at point 903 a hydraulic fracturing can continue or another step (down) test can be performed. The data from these tests can be used to determine fracture extension pressure—representing an upper bound for the minimum horizontal stress or closure pressure.

A step down (represented by FIG. 6, effectively an inverse procedure of FIG. 9) analysis using surface-based pressure measurement is performed after fracture propagation is established. During shutdown or at another point if interest during treatment, the pumping rate is decreased in a step-wise fashion (e.g., 80 BPM, 60 BPM, 40 BPM) while pressure stabilizes. Lower injection rate results in lower pressure, and lower pressure/flow-related losses. It allows one to calculate parameters to model perforation friction (the pressure drop that occurs as fluid passes through perforation tunnels), and near-wellbore friction (the pressure drop that is thought to occur due to fracture complexity in the near wellbore region), and the wellbore friction (the pressure drop that accompanies flow along the well of the injected fluid). This typically requires understanding the dominant flow regimes (laminar vs. turbulent) in the well and fracture.

Injection is established for a series of injection rates as described, and pressure and flow rate are measured. Sufficiently long injection time is taken to ensure a stable, steady-state pressure is achieved at each flow rate step. Typically, pressure vs. rate at the end of each rate interval is then plotted to identify a change in the slope as in FIG. 5. The change, or "break" indicates start of fracture extension, theoretically equal to the magnitude of the sum of closure pressure, fracture-friction driven pressure drop, and propagation resistance. Primarily, these tests are designed to extract information from the pressure required to maintain a series of (increasing) or, in the case of step down, decreasing flow rates:
  1. to quantify perforation and near-wellbore friction; this is a common practice in fracture diagnostics (Note that an anomalously high near wellbore pressure drop, i.e., friction may cause an undesirable near wellbore screen-out.)

In addition:
  2. in micro-fracturing (DFITs), primarily with clear water, the pressure extrapolated to zero flow rate allows estimation of the least principal stress (the fracture extension pressure); to use this approach to constrain the least principal stress requires that the fracture extension pressure is approximately equal to the least stress.

Methods according to the present disclosure may utilize any existing step rate data. Such method may build on the data sets by utilizing the water hammer generated by the change in the flow. Additionally, if an active pressure pulse can be generated during each of the flow rate steps, then the water hammer/pulse data can be inverted:
  A. to refine calculations of pipe friction based on water hammer attenuation; and
  B. to interrogate near-wellbore fracture properties, e.g., to estimate fracture conductivity or width as a function of pressure, or as a second constraint on near-wellbore friction due to near-wellbore-fracture complexity (sometimes referred to as tortuosity).

Because the length of the wellbore does not change during a step rate test, the pulse times at the different pressure steps can be inverted to:
  C. calculate average tube wave propagation velocity as a function of pressure/flow rate
  D. further refine estimates of near-well fracture hydraulic properties.

Because the properties of the top and bottom of the wellbore are unlikely to change during the short time that step rate tests are conducted, and, because the fluid used is typically very simple (no proppant, although sometimes gels/viscosifiers/friction reducers are used during step tests), the differences between the properties at each step can be used, e.g., by inversion, to obtain changes in fracture and wellbore properties such as fracture aperture (width) or tube wave attenuation. If this inversion can be carried out in real time, it may offer the opportunity for real-time diagnostics to be applied while fracture treatment operations are still underway.

Comparisons of pre-fracture treatment and post-fracture treatment step (down) rate tests can reveal differences in the reservoir and wellbore fluid system prior to and following pumping the fracture treatment. For example, velocity differences can reveal failure to flush previous fluids or the presence of sand or other residual materials; changes in near-well fracture properties or friction; reservoir stress changes, etc.

An example of a step down test analysis method by inversion matching the wellbore and fracture model (e.g., that of Dunham et al. 2017, or U.S. Patent Application Publication No. 2018/0320514) to the measured pressure obtained during hydraulic fracturing is depicted in FIG. 8. In this case the inversion computed an effective fracture width of an equivalent fracture connected to the wellbore and filled with a material with a known or assumed permeability and 1.2 m wide, distributed over 60 perforations in 10 clusters, but it can also be represented by an inversion for $Nkw/\mu$, where N is the number of symmetric/equivalent fractures/clusters, k is near-wellbore permeability, w is a fracture width, and $\mu$ is viscosity. As disclosed before, a choice of model will depend on the conditions analyzed, and in this case, a finite-width fracture with a fluid flowing between its walls may be more appropriate for both injection conditions, and for early-stage, pre-closure and post shut-in conditions.

Figure 16A:
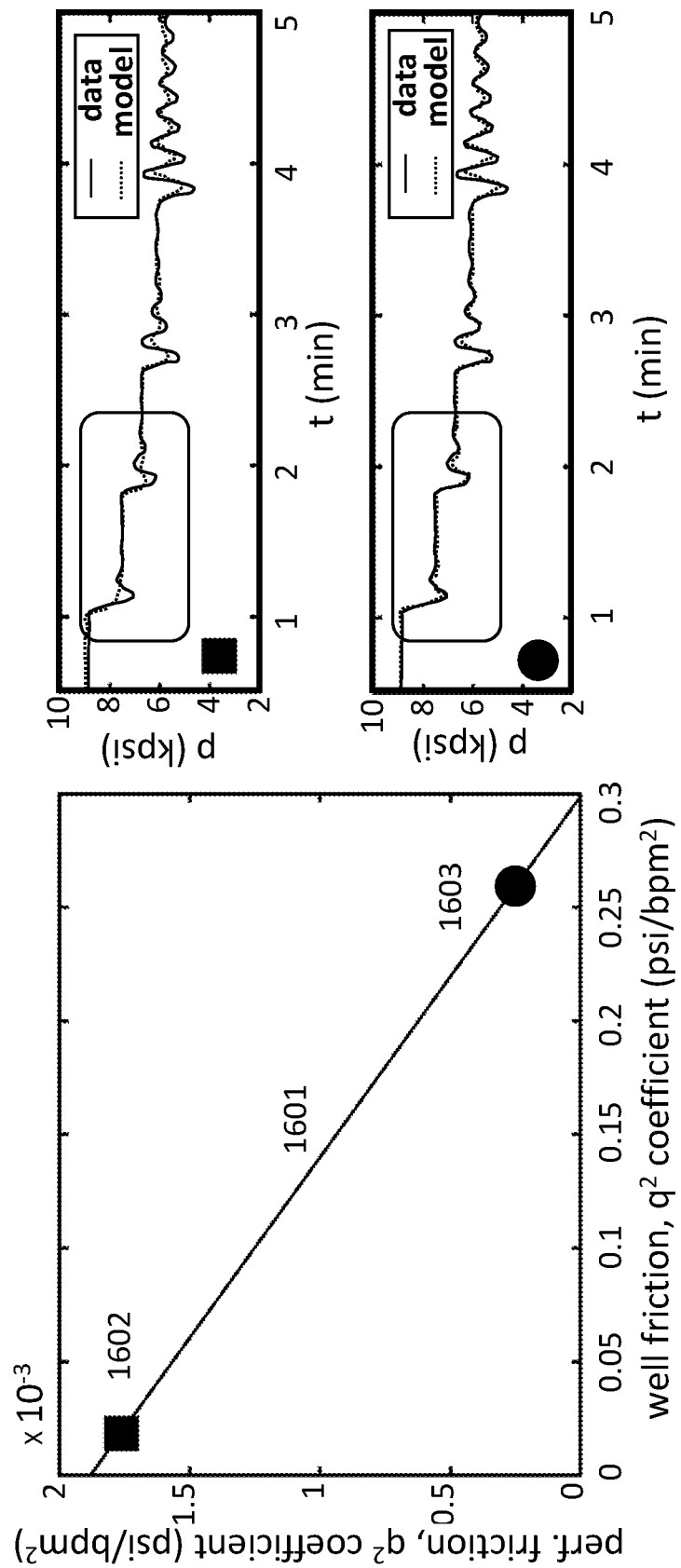
FIG. 16a-b show and demonstrate sensitivity of parameters to friction and the implications on the friction parameters relationship as well as quality of the fit to data.

This portion of the disclosure provides various methods to determine fluid friction in portions of the wellbore and based on the determined friction, it may then be possible to adjust fluid pumping parameters for better understanding of the wellbore system and reservoir formation. Friction determination can be performed as part of an injection test analysis, for example, or more generally, during any pumping of a hydraulic fracturing treatment. When a fluid flow rate change (dQ/dt≡dR/dt) implemented as a step change in rate a large water hammer may be generated, e.g., as shown in FIG. 16a. Note, that for typical but the lowest flow rates, fluid flow in the well based on the Reynolds number will be turbulent.

Some of the tests may be performed as an operational matter of course: To start hydraulic fracturing, a fluid flow rate into a well must be increased from zero to a selected flow rate, e.g., as high as 100 BPM. In practice, flow increase is performed by turning on and gearing up a series of many (often up to twenty) truck pumps. In some embodiments, the pumps may start in several steps and switch gears simultaneously on pumps, which results in jumps of rate e.g.: 0-20 BPM, 20-40 BPM, 40-60 BPM, 60-80 BPM as pumps are brought "on-line". Although a fast rate ramp is advisable to rapidly establish fracture propagation, a period of steady flow rate in between needs to pass to make sure other operational or wellbore issues do not cause the pressure to rise too rapidly. Thus in practice, pumps are turned on in such steps. On shut-in, pumps are also shut down typically steps, as to limit damage to equipment from too abrupt of a stall in rate.

However, a typical step rate (step down or up) test is performed early on during hydraulic fracturing treatment. The disclosed method is applicable to any step rate change test.

Step-rate tests may extend over a range of injection rates, quantifying (steady state) pressure at each rate. Rate-dependence of pressure may be analyzed to quantify well and perforation friction ($Q^2$) and near-wellbore friction ($Q^{1/2}$) related to flow path tortuosity. Flow rate step changes also produce water hammer, which are otherwise a nuisance only, and in the present example embodiment may be used to characterize fractures hydraulically connected to the wellbore.

Figure 18:
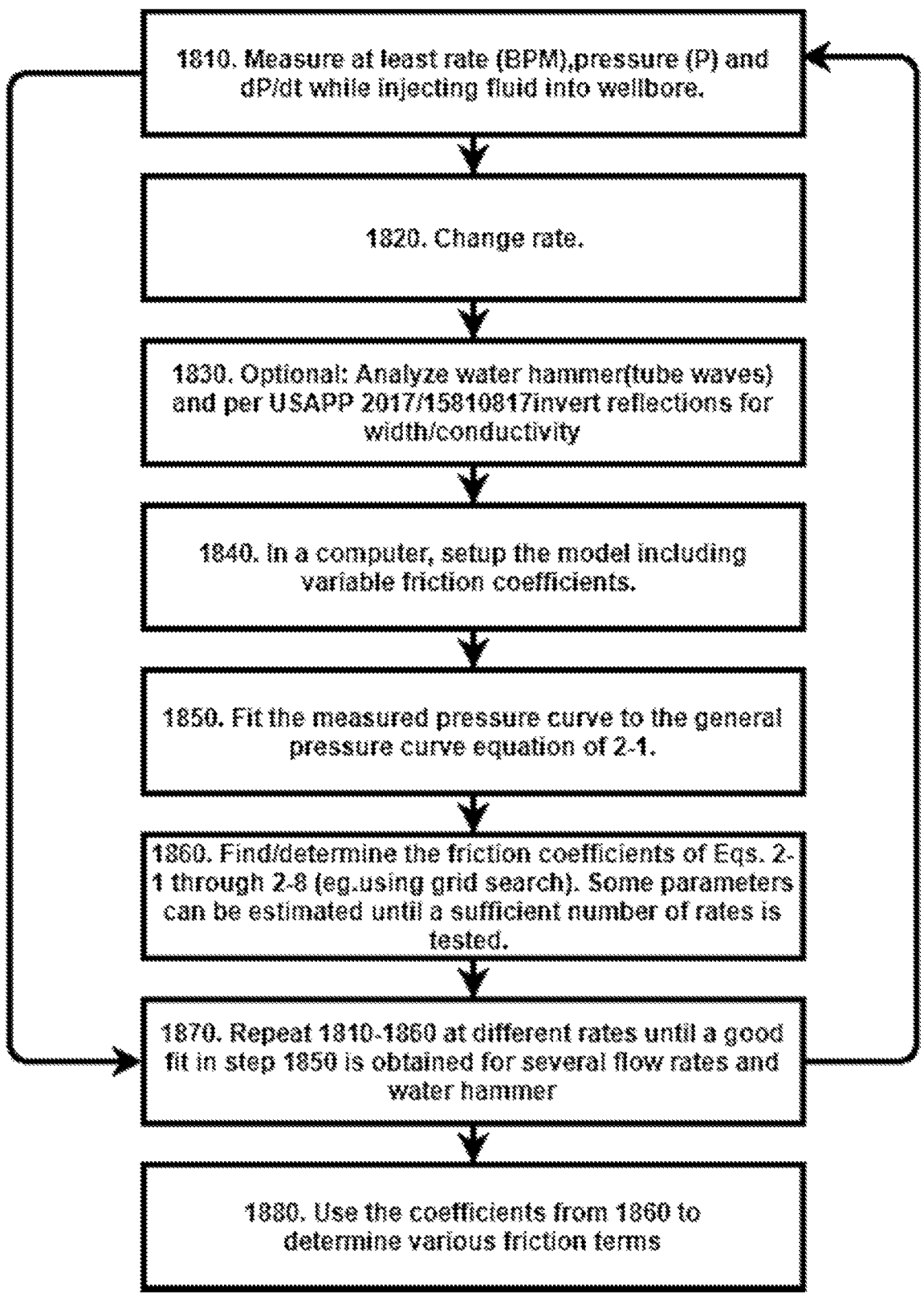
FIG. 18 shows a flow chart of a method for determining friction.

It is possible to model certain aspects of step-rate tests, thereby placing better constraints on friction. A flow chart of a method to determine friction is explained herein with reference to FIG. 18.

At 1810, while the well is being treated by fluid pumping at a first flow rate Q, measurements are made that include fluid flow rate (Q, R), fluid pressure (P), and pressure time derivative signals (dP/dt) using, for example, a flowmeter, a pressure transducer, and a hydrophone. Flow rate may be measured or inferred, e.g., from pump operating parameters.

At 1820, the flow rate is changed up or down in a stepwise fashion to a second flow rate, e.g., 0 BPM to 20 BPM, 20 BPM to 40 BPM, 60 BPM to 40 BPM, 20 BPM to 0 BPM, etc.

Figure 10:
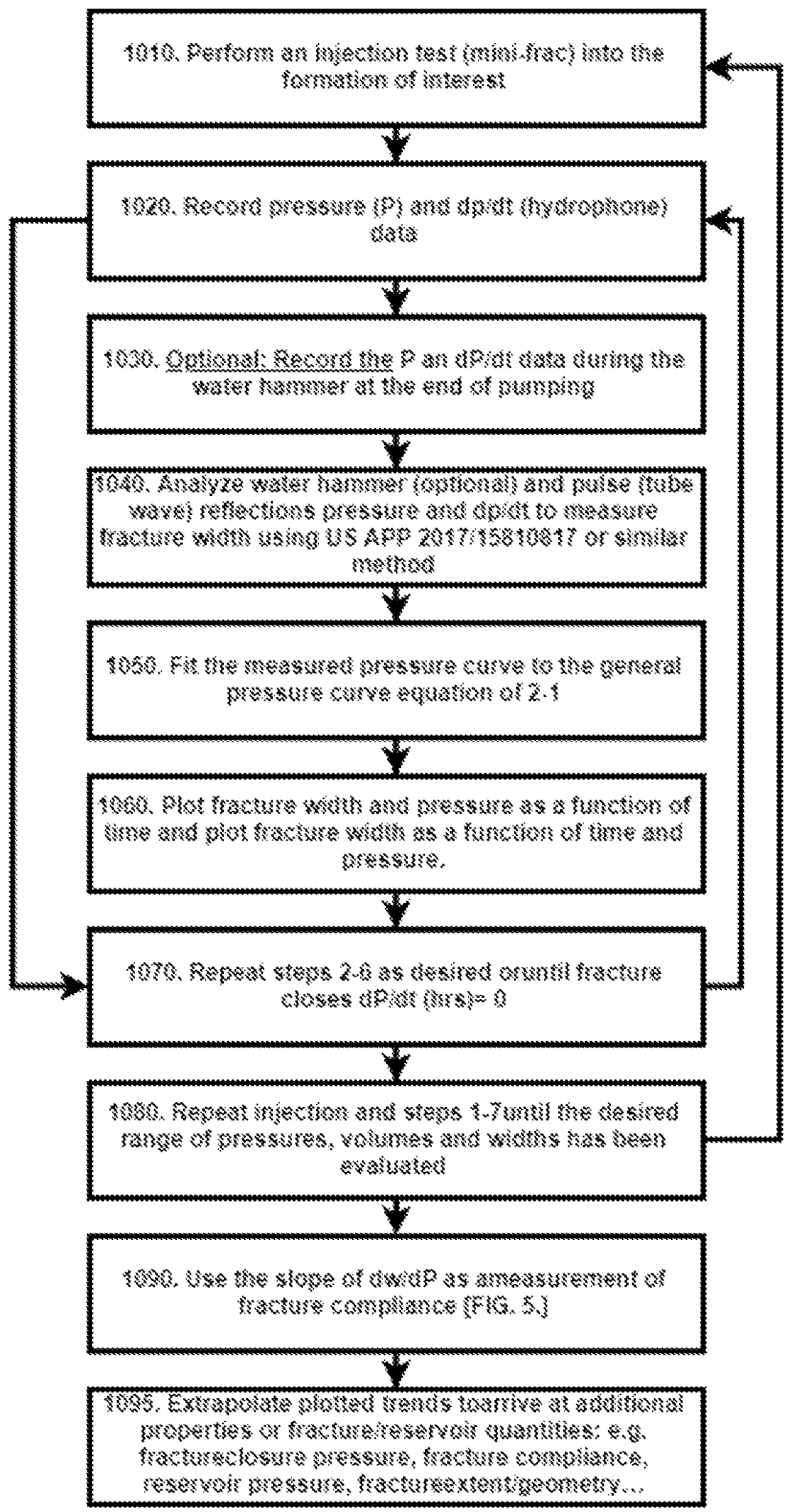
FIG. 10 is a flowchart of an example embodiment of a method according to the present disclosure.

In an optional step at 1830, the water hammer generated due to the change in flow rate can be analyzed as explained herein with reference to Dynamic DFIT and FIG. 10.

At 1840, a model is set up for the step-rate test:
 i. Model is setup to take into account the wellbore completion structure, using known measured depth to fractures/plug for some stage, as well as casing and fluid properties (fluid density, tube wave speed, wellbore cross-sectional area).
 ii. Secondly, introduce fractures in the model (for post-fracture modeling), modeled as porous layers with some width, permeability, and storage properties.
 iii. Thirdly, introduce well casing (or liner) perforations in to the model using a known formula [e.g., Cramer, SPE, 1987] for turbulent pressure drop in terms of number of perforations, perforation diameter, fluid density, and flow rate. Ref. Cramer, D. O.: *Application of Limited-Entry Techniques in Massive Hydraulic Fracturing Treatments*", paper SPE 16189 presented at the 1987 SPE Production Operations Symposium, Oklahoma City, March 8-10.

Figure 15:
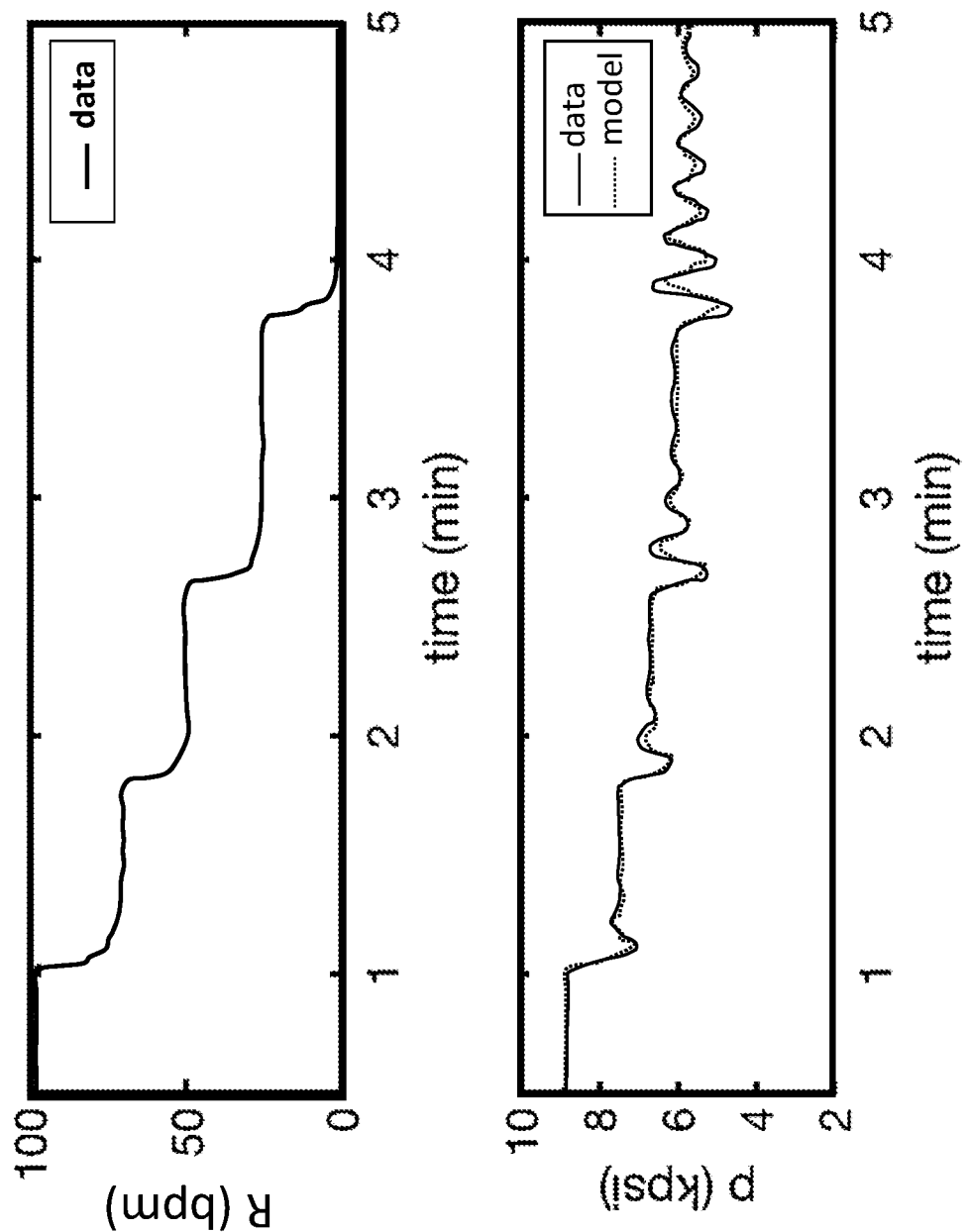
FIG. 15 shows a very good agreement data fit based on a grid search of the data for a step-rate water hammer.

At 1850, computation is performed:
 i. Forward model the wellbore pressure using known injection rate history as source to calculate an expected wellhead pressure history. Rate data is imposed in the simulation as a boundary condition at the wellhead.
 ii. Adjust model parameters (e.g., perforation friction, well friction, fracture properties) to obtain better match between the modeled pressure and the measured pressure (FIG. 15).

Start with a theoretical prediction of perforation friction (based on number of perforations, perforation diameter, etc.). Vary a wellbore friction coefficient until a steady state is matched.

Adjust model fracture properties (length, conductivity) to improve match.

Adjust selected parameter values (i.e., adjust perforation and well friction) along trade-off curve FIG. 16a.—this help to assure that steady state remains matched. With enough misfit it is possible to independently constrain perforation and wellbore friction.
 iii. Since both well and perforation friction (pressure drop) are proportional to $q^2$ (square of the flow rate in steady state), constraints on perforation friction from typical steady state analysis are non-unique (without independent constraints on well friction):

$$P_{friction,\ q\text{-}squared} = P_{well} + P_{perf} = (c_{well} + c_{perf}) \cdot Q^2$$

Figure 16B:
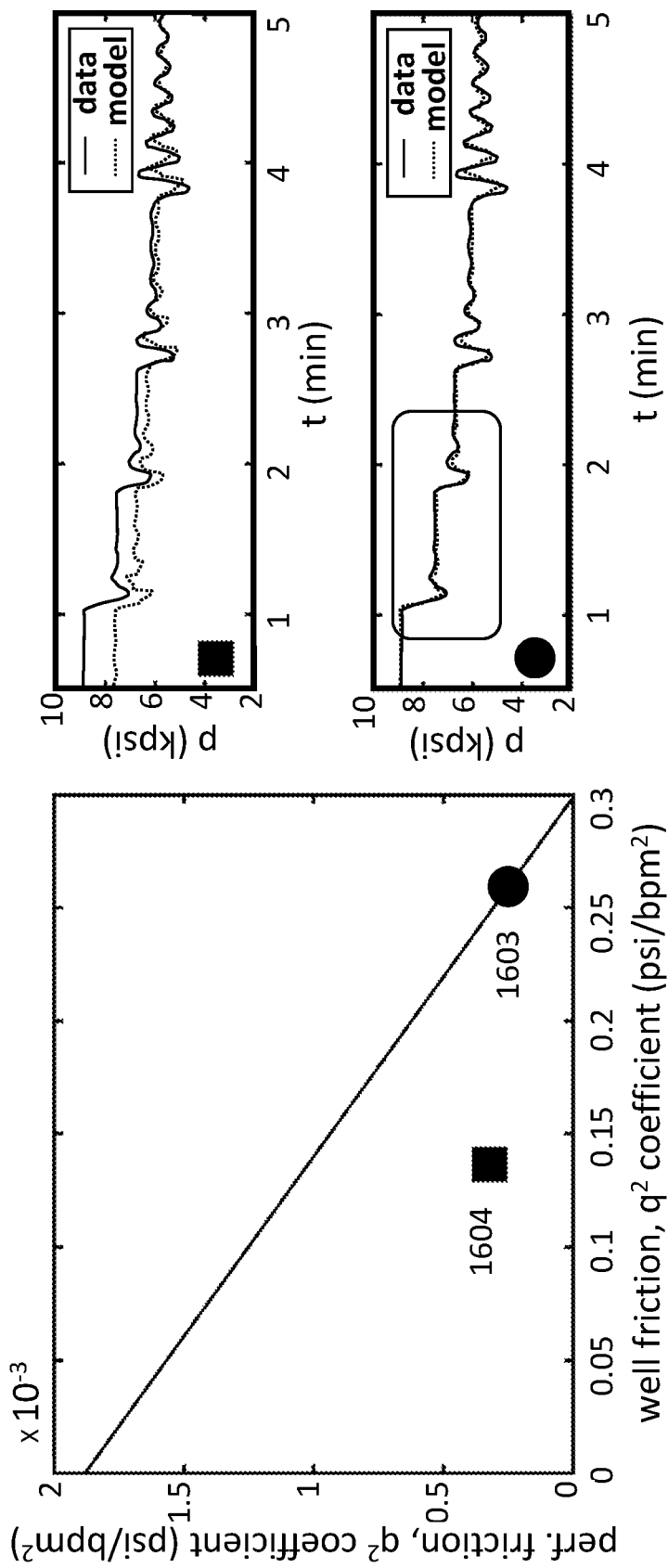

At 1860, the non-uniqueness of the result at 1850 can be resolved by matching water hammer as well as steady state, which is shown in FIG. 16a, where a set of reasonable solutions must lie on line 1601. The line 1601 is a line of parameter combinations that preserves $c_{well} + c_{perf}$ (i.e., same steady state). Note that top right corners of FIGS. 16a, 16b represent "poor" fit, whereas bottom right (circle) represents a good fit.
 i. A well friction and perf friction coefficients can thus be determined. For a simulation that fits the data reasonably well, calculate relative importance of well friction to perf friction (round circle 1603 in FIG. 16a):
  $c_{well}/c_{perf} = 0.2620/0.0179 = 14.6070$, therefore, in this case, the flow is mainly constrained by well friction when matching data. Perforation friction can be related to the quality or size and shape of the perforations.
 ii. Including other parameters of friction dependent on rate, and maximizing fit, allows one to similarly estimate near-wellbore friction, and fracture flow friction (pressure drop). Best fitting parameters can be determined by nonlinear optimization to minimize misfit (between data and model) in time and/or frequency domain.

At 1870, 1810 through 1860 can be repeated for various values of flow rate. This can be used to determine dominant friction terms (see an example the graph in FIG. 19) at each flow rate, or to determine remaining rate-dependent estimates of the various friction terms. Three different flow rates may enable determining up to 4 friction coefficients (3 equations, 3 unknowns, and a relationship between ($c_{well} + c_{perf}$).

At 1880, the square root, linear, and quadratic coefficients are assigned to their respective dominant friction terms in eq. 2-1 and thus various pressures—fracture flow, fracture extension and near wellbore pressure with related friction terms are determined.

Fundamental assumptions in the present example embodiment are that there is a pressure drop, or resistance to fluid flow, across various "obstacles" in the wellbore. This pressure drop comprises components each related to flow rate (Q or R) by a different exponent, e.g., $$P_{surface}(Q) = P_{reservoir} + C \cdot Q^{1/2} + (B = (c_{well} + c_{perf})) \cdot Q^2 + A \cdot Q + P_{extension} \text{h.o.t.} \text{ (higher order terms or corrections)},$$

wherein Q represents fluid flow rate and various pressures (P) are at the surface, the reservoir formation, the well and perforations, and any fracture extensions pressures. By associating the dominant pressure drops with each "obstacle", and matching water hammer, one can "decouple" the friction drops due to the wellbore and across the perforations. Having several rates (i.e. 3 rates in a test), allows for 3 equations and thereby a unique determination of the rate coefficients A, B, C. A good model will be able to also match the flow rate change caused water hammer at various steps. The fits shown have a good agreement with the data, and thus the quantities of friction determined should be close to reality.

There are various reasons why determining the friction is important. Too high of a friction in perforations (high $c_{perf}$ coefficient) may indicate a poor perforation job, or a possible screenout risk, high friction in horizontal and vertical sections of the wellbore (high $c_{well}$ coefficient) may show indicate poor cleanout of the wellbore, or some unexpected wellbore tubing roughness. High C coefficient above may be associated with near-wellbore flow resistance, for example, it may indicate a very tortuous near wellbore fluid flow path in the reservoir formation and/or fractures region (i.e., high complexity).

Based on the equipment used to obtain measurements for the present example method, some friction coefficients or pressure drops may be assumed to simplify fitting the curve. Also, to arrive at better fits, other, possibly higher-order terms, such as proportionality to the cube of flow rate, other corrections may be added.

Optimizing the curve fits can be obtained using various known methods. One non-limiting example method to optimize fit is to use N-space (N-parameter) grid search to identify global (and local) minimum or minima.

Figure 19:
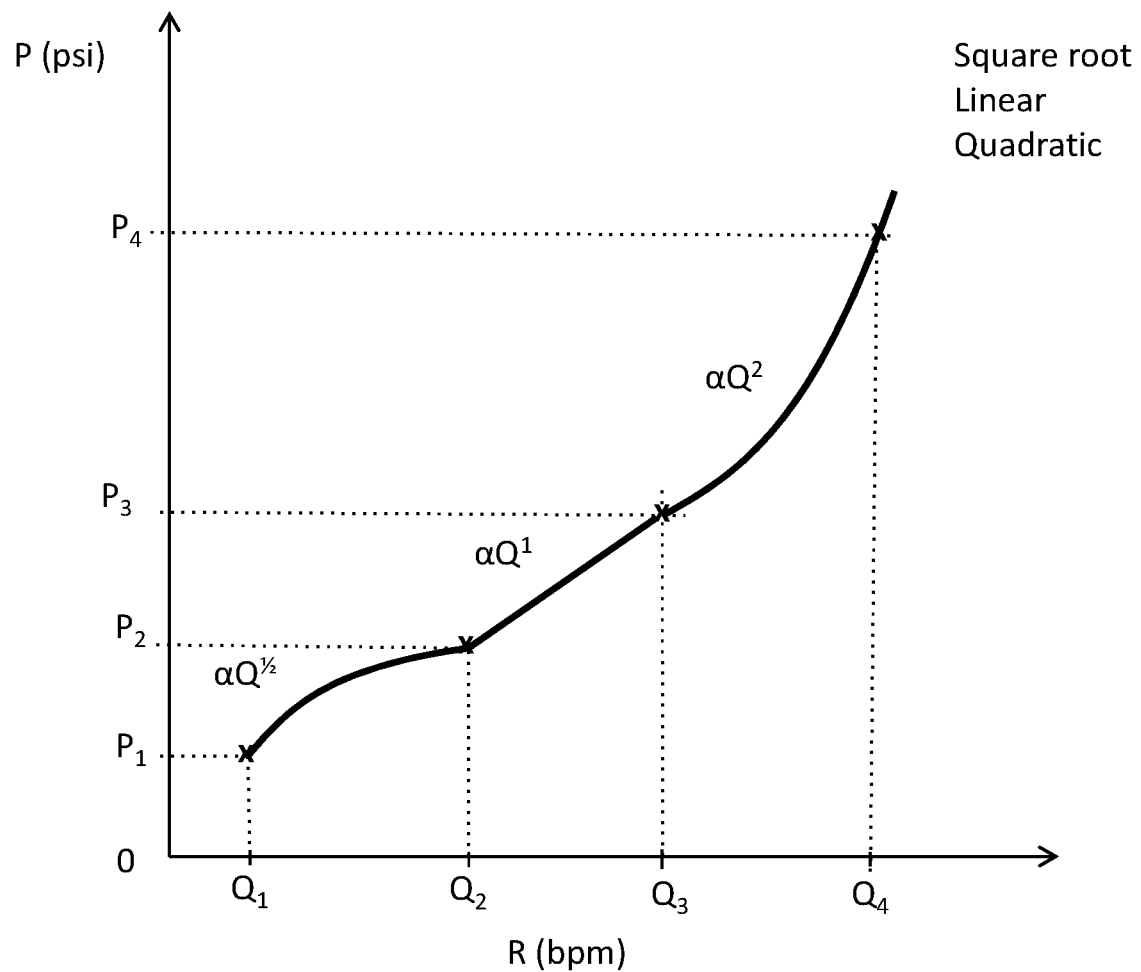
FIG. 19 shows a graph illustrating various dominant friction dependence as a function of flowrate.

FIG. 19 shows a graph of various dominant friction dependence as a function of flowrate.

Figure 7:
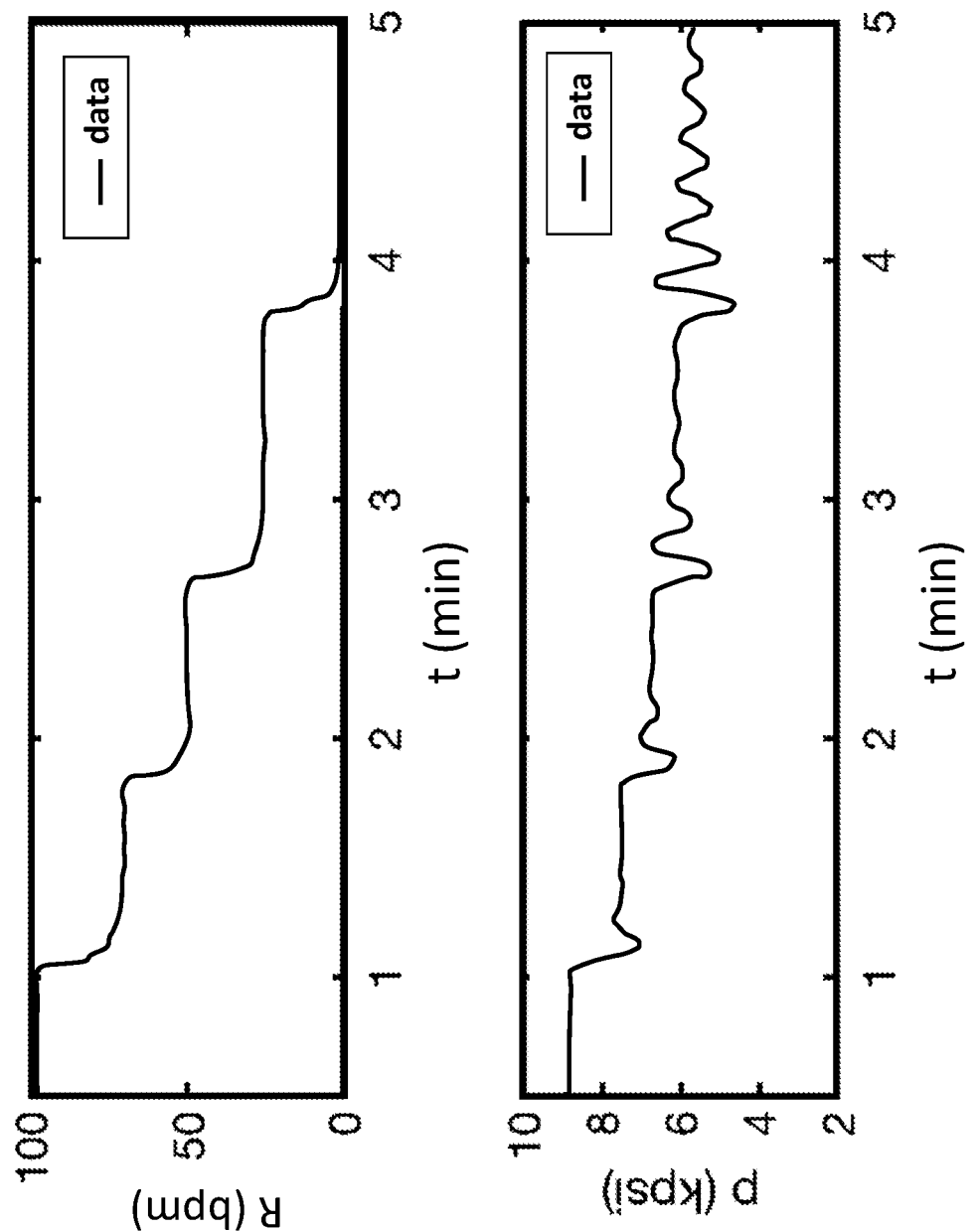
FIG. 7 shows data of an example of a step down test and measured injection rate and fracture pressure.

FIG. 7 shows typical step down test data. FIG. 8*a* depicts curve fits of the data, which included quite a strong water hammer, and model to generate a close matching curve at the end on the right hand side, resulting in the parameters in FIG. 8*b* (w=1.2 m, $f$=0.002, $c_1$=1.76E+7).

Largely equivalent analysis and inversion can be performed for step down (FIGS. 6, 7, 8) as well as step (up) rate (FIG. 9) tests, again both utilizing a water hammer and a potential "active" source. FIG. 9 shows such a step up (step rate) test with water hammers 901, and pressure increasing from $P_0$ at t, R=0, $P_1$ at $t_1$ and $R_1$, to $P_3$ at $t_3$ and $R_3$. After time $t_5$, typically a hydraulic fracturing treatment may resume or begin in full swing as rate and fractures are established, but a Mini Frac type analysis or a step rate tests using known methods as described above can again be performed at a later time (5, 10 minutes) to further diagnose formation and fracture properties.

Measuring and Decoupling Perforation Friction and Wellbore Friction

Figure 13:
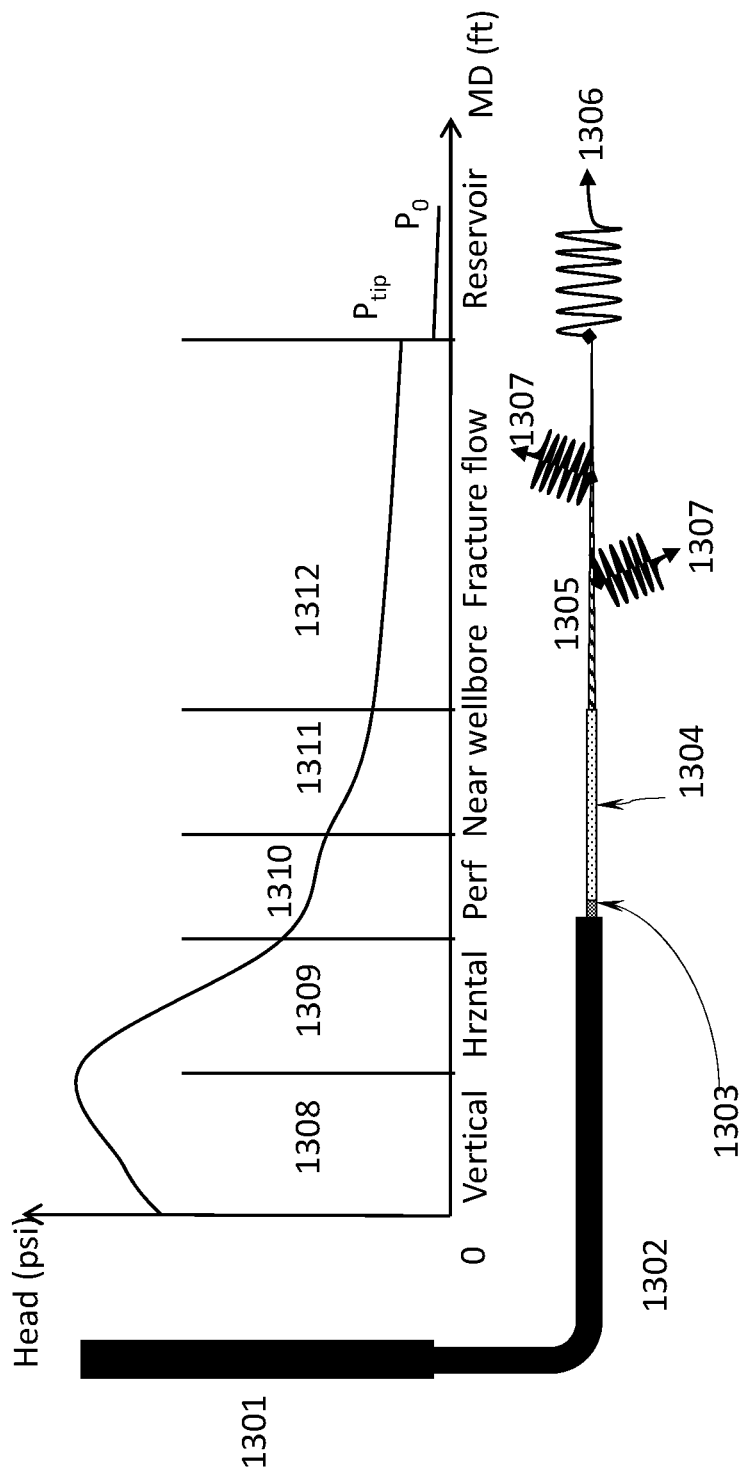
FIG. 13 shows a schematic pressure profile and various pressure decay trends across the specific portions of the flow Q during a step-rate or DFIT test and subsequent leak off. The expected proportionality of each pressure drop or increase is described.

A general relationship between fluid flow, Q ($\equiv$R above) and various pressure drops during steady-state flow conditions in a step-rate test, as shown in FIG. 13, can be described as follows:

$$P(Q)=P_{fractureflow}+(P_{wellbore}+P_{perforation})+P_{nearwellbore}+P_{extension}+P_{reservoir},\quad\text{[eq. 2-1]}$$

where $P_{fracture}=AQ^1$ is assumed to be a linear, laminar flow through a fracture and A is a function of fracture width, $P_{wellbore}\propto Q^2$ is a pressure drop due to turbulent friction in the wellbore, $P_{perforations}$ is a (typically turbulent) pressure drop due to flow through a set of orifices $P_{perforations}\propto Q^2$, i.e. perforations, $P_{nearwellbore}\propto Q^{1/2}$ is a function of near-wellbore complexity/tortuosity, $P_{extension}$ is the pressure required to propagate the fracture and is a function of the far-field stress and of near-fracture-tip processes known to fracture mechanics engineers, and $P_{reservoir}$ is (can be assumed to be a constant) background reservoir pressure, or can be neglected if fracture propagates at enough or if leak off is low enough. There are certain assumptions made to use DFIT calculations known in the art, and those assumptions are appropriate some of the time but not all of the time. As a result, DFIT analysis approaches using flow rate and pressure can provide ambiguous results.

Eq. 2-1 can be written by collecting the linear, quadratic, and square root coefficients of flow rate based on the dominant flow regimes expected to arrive at:

$$P(Q)=AQ^1+BQ^2+CQ^{1/2}+P(Q)+P_0.\quad\text{[eq. 2-2]}$$

Where P is measured pressure, Q is the flow rate, A, B, C are linear, quadratic, and square root coefficients and $P_0$ is reservoir pressure. The linear coefficient A will be a function of fracture geometry, e.g., L=Length, w=width, h=height. The quadratic coefficient will have two independent terms: one due to the wellbore, which can be estimated based on known geometry, materials, and surface; and a second independent term representing perforation friction for which a fit can be performed. The perforation friction coefficients (See, Lizak, 2006) are known to be in the range of $\sim 1\times 10^8$ Pa·s$^2$/m$^6$ for a perforation not ablated by hours of pumping sand. The square root of flow rate, C-coefficient is that of friction term most closely representing near-wellbore geometry, complexity, and a measure of tortuosity. In general, flow rate measurements cannot clearly distinguish between the contributions of the perforation and wellbore friction without adopting more complicated injection schemes and models.

The square of flow rate coefficient (B) is the one most associated with turbulent flow due to the well ($c_{well}$) and across the perforations ($c_{perf}$) and thus to perforations properties. The linear coefficient is related to fracture properties, and the square root represents near-wellbore conditions, such as "tortuosity". Knowing Q(t), a total volume of injected fluid can be integrated, and a constraint on fracture geometry, size, or extent can be obtained if the rate of fluid loss from the fracture and its shape away from the well are both known. One of the benefits of this invention is providing an independent constraint on width, and closest fracture boundary, or the distance to the end of the propagating fracture (proxy for fracture length).

By proper fits of amplitudes, time delays, period of water hammer, and decay rate, the step rate test pressure curve can be fitted and relevant properties extrapolated. Additionally, if a use of an active pulse or a water hammer (204, 604 respectively) is possible during the step rate or step down analysis, as depicted in FIG. 6, then additional measurements and information can be obtained as previously described in section on dynamic DFIT.

Fracture length and overall geometry can be determined, for example making a simple penny-shaped fracture geometrical model and flow estimates to where $A(L,w)\propto \frac{1}{12}*w^3$, a cubic law known for parallel-plate Poiseulle flow.

On the upper portion of FIG. 13. is an example wellbore diagram showing surface casing, 1301, production casing in the horizontal portion of the well, 1302, perforations, 1303, a near wellbore region 1304, a fracture, 1305, edge leak off, 1306, and face leak off, 1307. A schematic example of how pressure drop may be exhibited over the wellbore during a flow test, during a pressure test or during a step rate test is depicted with coefficients and dependence in top of FIG. 13 with arbitrary units of pressure and measured depth (MD in feet).

For the well system shown in FIG. 13, assuming a constant flow, the various friction pressure increase or decrease of the well and fracture contribute (MD is measured depth):

1308: Vertical: $P_{surface}+P_{hysdrostatic}-P_{flow}(\propto MD)-P_{flow}(\propto -c_{well}\cdot Q^2)$ [eq. 2-3]

1309: Horizontal: $P_{flow} \propto -c_{well}\cdot Q^2$ [eq. 2-4]

1310: Perf friction: $P_{perf} \propto -c_{perf}\cdot Q^2$ [eq. 2-5]

1311: Near-wellbore friction: $P_{nwb} \propto -C\cdot Q^{1/2}$ [eq. 2-6]

1312: Fracture flow: $P_{fractureflow} \propto -A\cdot Q^1 \propto w(L,P)^3$ [eq. 2-7]

1313: Edge leak off: $P_{edge}=P_{tip}-P_{reservoir}$ [eq. 2-8].

Note that in the equations above, the friction directly relates to certain properties. Vertical to "smoothness" of the well and fluid property/types, horizontal to type of flow and pipe friction coefficient in the wellbore, perforation friction to quality, size, and quantity of perforations, near wellbore friction to near wellbore tortuosity (complexity), and fracture flow to fracture geometry, permeability, and other properties.

Figure 12:
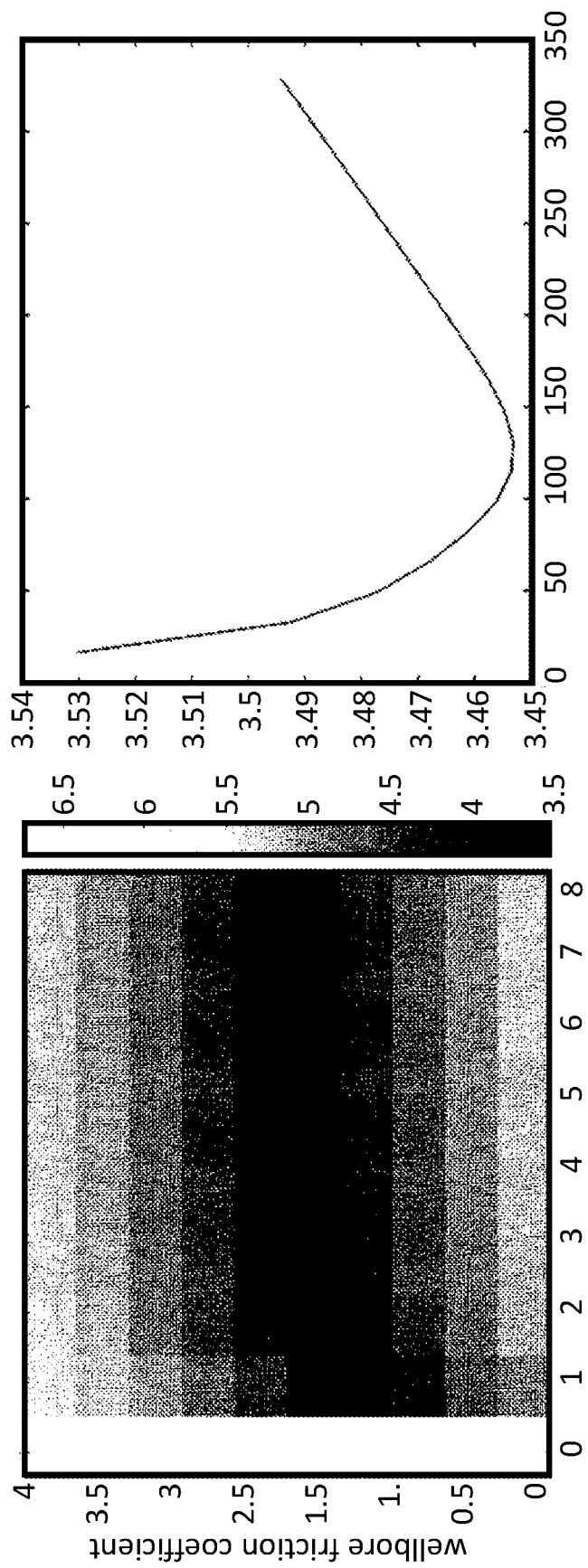
FIG. 12 shows an example grid search that can be used in the inversion algorithms for determining the searched properties, in this example fracture length.

FIG. 12 shows one way to optimize a fit. A grid search or other optimization method can be used to determine best-fitting model parameters that include width, length, friction coefficients, etc. Such approach is exemplified by grid search in FIG. 12, or similar algorithm can be performed based on the best possible fit. A least misfit value can identify the fracture length, as shown in the right part of FIG. 12. In the particular example case of an actual fractured well (not an injection test), a realistic value of about 120 ft for a real-fracture length is expected. If a proppant of known mesh size (diameter) has been injected, fracture geometry can be further constrained (e.g. by assuming a single fracture width being diameter of the proppant grains). Width can also be measured as described.

Figure 14:
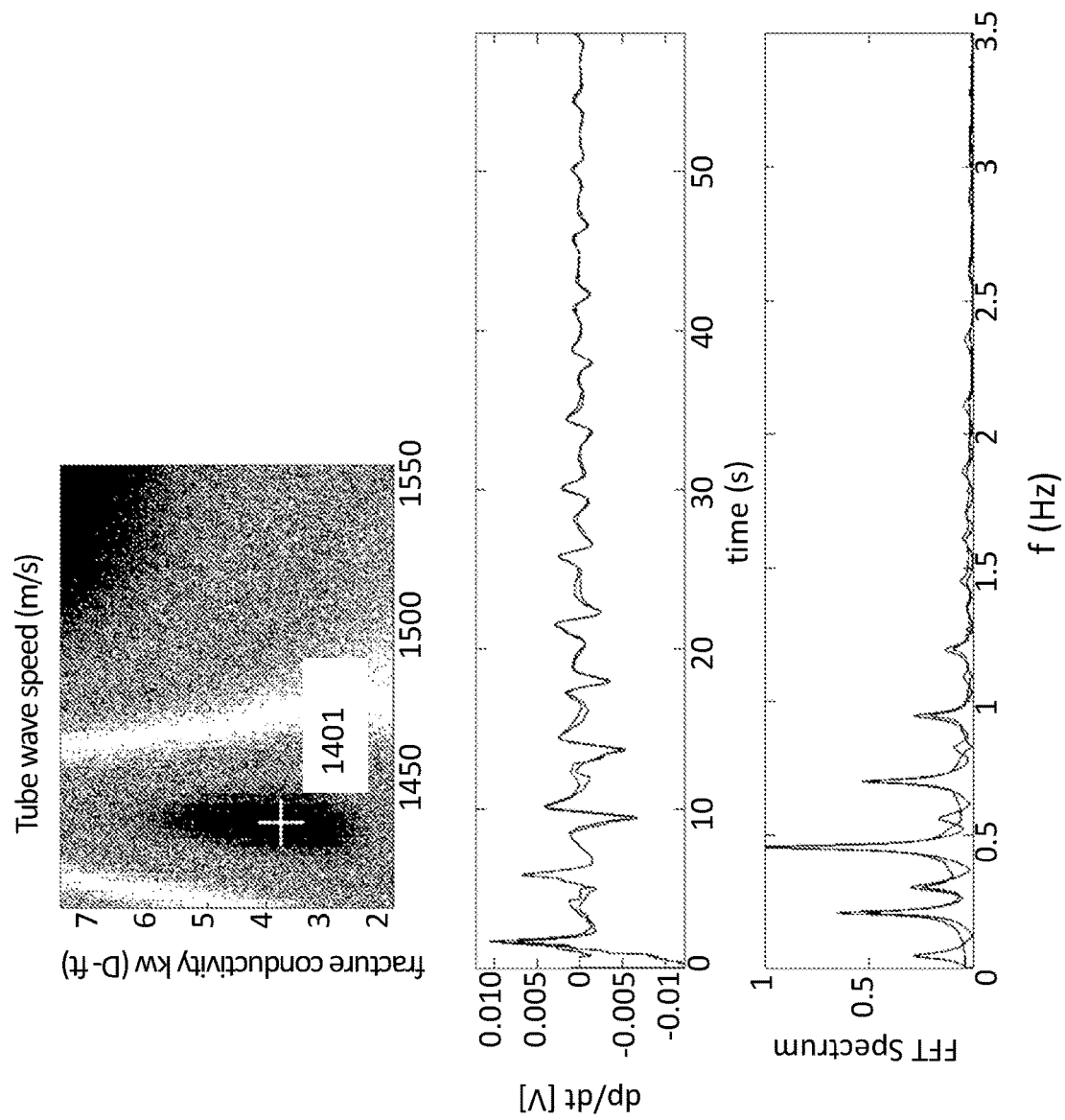
FIG. 14 shows another example of grid search (similar to FIG. 12), this time applied to a water hammer data, not a controlled source, and used to determine fracture width, w=conductivity/(fixed permeability, k). Conductivity=k*w.

FIG. 14 shows another example of grid search (similar to FIG. 12), this time applied to a water hammer data, not a controlled source. One can see the data and model are in a good agreement (1401). Note that this is application of the method is to water hammer data only. Lower wave speed than in the active source example is caused by presence of wireline during water hammer—demonstrating ability to monitor wellbore and fluid properties as well as fractures. 1401 represents bet fitting solution. Model parameters include fracture conductivity kw, tube wave speed, tube wave attenuation (quality factor Q). The inversion must account for many details of well design/completion, fluid properties, source waveform, etc., to successfully infer parameters of interest and avoid trade-offs.

FIG. 15 shows the data fit water hammer well, based on grid search determined parameters from FIG. 8.

FIG. 16a demonstrates friction parameter combinations that preserve the friction ($c_{well}$ and $c_{perf}$), shown at line 1601. Both parameter combinations provide a good fit to the data. What is displayed is the sensitivity of parameters to friction and the implications on the friction parameters relationship as well as quality of the fit to data. FIG. 16b. shows which parameter combinations of friction have a good, circle, 1603, and poorer, square 1604, fits. In FIG. 16, lower case q is used for rate (q≡R≡Q).

Example Implementation

Figure 17:
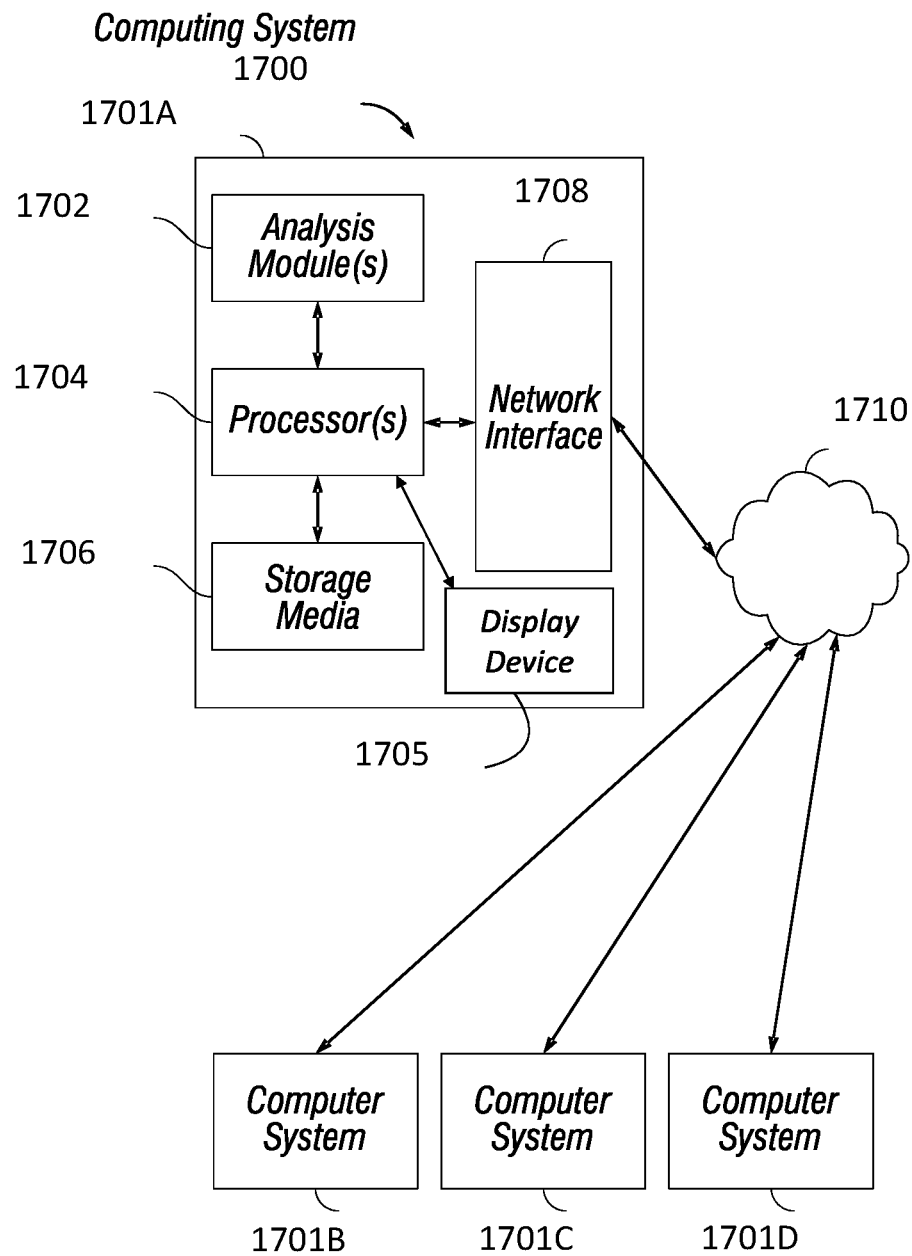
FIG. 17 shows an example embodiment of the processing device and system for determining fracture properties according to the present disclosure.

FIG. 17 shows an example computing system 1700 in accordance with some embodiments. The computing system 1700 may be an individual computer system 1701A or an arrangement of distributed computer systems. The individual computer system 1701A may include one or more analysis modules 1702) that may be configured to perform various tasks and controls according to some embodiments, such as the tasks explained with reference to FIGS. 2-16. To perform these various tasks, the analysis module 1702 may operate independently or in coordination with one or more processors 1704, which may be connected to one or more storage media 1706. A display device (1705) such as a graphic user interface of any known type may be in signal communication with the processor 1704 to enable user entry of commands and/or data and to display results of execution of a set of instructions according to the present disclosure.

The processor(s) 1704 may also be connected to a network interface 1708 to allow the individual computer system 1701A to communicate over a data network 1710 with sensors, one or more additional individual computer systems and/or computing systems, such as 1701B, 1701C, and/or 1701D (note that computer systems 1701B, 1701C and/or 1701D may or may not share the same architecture as computer system 1701A, and may be located in different physical locations, for example, computer systems 1701A and 1701B may be at a well drilling location, while in communication with one or more computer systems such as 1701C and/or 1701D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 1706 that captures data in a tangible medium may be implemented as one or more computer-readable or machine-readable storage media. Note that while in the example embodiment of FIG. 17 the storage media 1706 are shown as being disposed within the individual computer system 1701A, in some embodiments, the storage media 1706 may be distributed within and/or across multiple internal and/or external enclosures of the individual computing system 1701A and/or additional computing systems (e.g., 1701B, 1701C, 1701D), or over a network ("cloud"). Storage media 1706 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

It should be appreciated that computing system 1700 is only one example of a computing system, and that any other embodiment of a computing system may have more or fewer components than shown, may combine additional components not shown in the example embodiment of FIG. 17, and/or the computing system 1700 may have a different configuration or arrangement of the components are shown in FIG. 17. The various components are shown in FIG. 17. may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Although only a few examples have been described in detail above, those skilled in the art will readily appreciate that many modifications are possible in the examples. Accordingly, all such modifications are intended to be included within the scope of this disclosure as defined in the following claims.

REFERENCES CITED

1. Dunham, E. M., Harris, J. M., Zhang, J., Quan, Y., & Mace, K. (2017, Oct. 23). Hydraulic fracture conductivity inferred from tube wave reflections. Society of Exploration Geophysicists.

2. Soliman, M. Y., & Gamadi, T. D. (2012, Jan. 1). Testing Tight Gas and Unconventional Formations and Determination of Closure Pressure. Society of Petroleum Engineers. doi:10.2118/150948-MS 3. Barree, R. D., Barree, V. L., & Craig, D. (2009, Aug. 1). Holistic Fracture Diagnostics: Consistent Interpretation of Prefrac Injection Tests Using Multiple Analysis Methods. Society of Petroleum Engineers. doi:10.2118/107877-PA 4. Barree, R. D., Barree, V. L., & Craig, D. (2007, Jan. 1). Holistic Fracture Diagnostics. Society of Petroleum Engineers. doi:10.2118/107877-MS 5. Lizak, K. F., Bartko, K. M., Self, J. F., Izquierdo, G. A., & Al-Mumen, M. (2006, Jan. 1). New Analysis of Step-Rate Injection Tests for Improved Fracture Stimulation Design. Society of Petroleum Engineers. doi:10.2118/98098-MS 6. SPE Webinar: Overview of Current DFIT Analysis Methodology (Mar. 14, 2013)—Bob Barree ed: Fracture mechanics—PetroWiki: http://petrowiki.org/index.php?title=Fracture_mechanics&rel-1&printable=yes Before-Closure Analysis G-function Derivative Analysis 7. Nolte, K. G. 1979. Determination of Fracture Parameters from Fracturing Pressure Decline. https://doi.org/10.2118/8341-MS 8. Castillo, J. L. 1987. Modified Fracture Pressure Decline Analysis Including Pressure-Dependent Leak off. https://doi.org/10.2118/16417-MS 9. Barree, R. D. & Mukherjee, H. 1996. Determination of Pressure Dependent Leak off and Its Effect on Fracture Geometry. https://doi.org/10.2118/36424-MS 10. Barree, R. D. 1998. Applications of Pre-Frac Injection/Falloff Tests in Fissured Reservoirs—Field Examples. https://doi.org/10.2118/39932-MS General Closure Analysis 11. Barree, R. D., Barree, V. L., Craig, D. P. Holistic Fracture Diagnostics: Consistent Interpretation of Prefrac Injection Tests Using Multiple Analysis Methods. https://doi.org/10.2118/107877-PA 12. Liu, G. & Ehlig-Economides, C. 2016. Interpretation Methodology for Fracture Calibration Test Before-Closure Analysis of Normal and Abnormal Leak off Mechanisms. https://doi.org/10.2118/179176-MS 13. McClure, M. W., Jung, H., Cramer, D. D., and Sharma, M. M. 2016. The Fracture-Compliance Method for Picking Closure Pressure From Diagnostic Fracture-Injection Tests. https://doi.org/10.2118/179725-PA Permeability Analysis 14. Mayerhofer, M. J. & Economides, M. J. 1993. Permeability Estimation from Fracture Calibration Treatments. https://doi.org/10.2118/26039-MS 15. Mayerhofer, M. J., Ehlig-Economides, C. A., and Economides, M. J. 1995. Pressure-Transient Analysis of Fracture-Calibration Tests. http://doi.org/10.2118/26527-PA 16. Craig, D. P. and Blasingame, T. A. 2006. Application of a New Fracture-Injection/Falloff Model Accounting for Propagating, Dilated, and Closing Hydraulic Fractures. https://doi.org/10.2118/100578-MS After-Closure Analysis 17. Gu, H. et al. 1993. Formation Permeability Determination Using Impulse-Fracture Injection. https://doi.org/10.2118/25425-MS 18. Abousleiman, Y., Cheng, A. H-D, and Gu, H. 1994. Formation Permeability Determination by Micro or Mini-Hydraulic Fracturing. J. of Energy Resources Technology (June 1994) 116(2), No. 6, 104-114

19. Soliman, M. Y. et al. 2005. After-Closure Analysis to Determine Formation Permeability, Reservoir Pressure, and Residual Fracture Properties. http://doi.org/10.2118/93419-MS New Type Curve Analysis (2006-Present)

20. Craig, D. P. and Blasingame, T. A. 2006. Application of a New Fracture-Injection/Falloff Model Accounting for Propagating, Dilated, and Closing Hydraulic Fractures. https://doi.org/10.2118/100578-MS 21. Craig, D. P. 2014. New Type Curve Analysis Removes Limitations of Conventional After-Closure of DFIT Data. https://doi.org/10.2118/168988-MS 22. Craig, D. P. & Jackson, R. A. 2017 Calculating the Volume-of-Reservoir Investigated During a Fracture-Injection/Falloff Test DFIT. https://doi.org/10.2118/184820-MS

What is claimed is:

1. A method for characterizing properties of a subsurface reservoir, comprising:
   inducing a fracture in a subsurface reservoir connected to a wellbore by pumping a selected volume of fluid into the subsurface reservoir thereby to constrain a geometry of the induced fracture;
   measuring at least one of pressure and a time derivative of pressure in the wellbore;
   generating a tube wave in the wellbore by changing a flow rate of fluid in the wellbore to induce water hammer;
   using the measured at least one of pressure and time derivative of pressure to determine a fracture width from detected tube wave events in the measured at least one of pressure and time derivative, the determining facture width comprising modeling a pressure-time response of the wellbore and formation and matching the modeled pressure-time response to a measured pressure time response of the wellbore wherein a water hammer effect in the measured pressure-time response matches a modeled water hammer effect;

determining a relationship between pressure and fracture width; and using the relationship to determine at least one of a fracture property in the reservoir and a reservoir formation property.

2. The method of claim 1 wherein the fracture property comprises at least one of fracture compliance, fracture closure pressure, fracture conductivity, fracture geometry, and fracture size.

3. The method of claim 2, further comprising determining a change in the fracture property with respect to time.

4. The method of claim 2 wherein fracture compliance is determined as a rate of decrease of fracture width with respect to pressure.

5. The method of claim 1, further comprising extrapolating a future value of the at least one of a fracture property and reservoir property after and end of a fluid pumping operation used to induce the fracture.

6. The method of claim 5 wherein the extrapolated future value of the fracture property comprises at least one of fracture width, fracture length, fracture compliance and fracture closure pressure.

7. The method of claim 6 further comprising using the extrapolated future value, at least one of reservoir permeability and formation pressure, and near wellbore fracture tortuosity to adjust at least one operating parameter of a subsequent hydraulic fracture treatment.

8. The method of claim 7 wherein the at least one operating parameter comprises fracture fluid pumping rate, proppant concentration, proppant particle size, type, and distribution and fluid viscosity.

9. The method of claim 1 further comprising determining closure of the induced fracture using the relationship.

10. The method of claim 1 wherein the changing the flow rate comprises stopping a pump to induce water hammer.

11. The method of claim 1 wherein the reservoir property comprises at least one of reservoir formation pressure and reservoir formation permeability.

12. The method of claim 1 wherein at least one of pressure and a time derivative of pressure is measured at a location proximate to a wellhead.

13. The method of claim 1 further comprising using the fracture property to adjust at least one operating parameter of a subsequent hydraulic fracture treatment.

14. The method of claim 13 wherein the at least one operating parameter comprises facture fluid pumping rate, proppant concentration, proppant particle size distribution, proppant type, and fluid viscosity.

15. A method for characterizing properties of a subsurface reservoir, comprising:
inducing a fracture in a subsurface reservoir connected to a wellbore;
extending the fracture by injecting a fluid into the wellbore at a first flow rate;
measuring pressure in the wellbore;
changing the flow rate to a second flow rate, the changing flow rate performed so as to induce tube waves in the wellbore as a result of water hammer;
determining a relationship between the measured pressure and resistance to flow at the first flow rate and at the second flow rate;
using the relationship to determine at least one of a fracture property, wellbore property, wellbore fluid property, perforation property and reservoir property, the determined at least one of a fracture property and reservoir property adjusted for pressure drop in the wellbore and in the fracture, the determining a facture property comprising modeling a pressure-time response of the wellbore and formation and matching the modeled pressure-time response to a measured pressure time response of the wellbore wherein a water hammer effect in the measured pressure-time response matches a modeled water hammer effect.

16. The method of claim 15 wherein the extending the fracture comprises the change in the flow rate being performed as at least one of a stepwise increase and a stepwise decrease.

17. The method of claim 16 wherein the fracture property comprises at least one of a pressure drop associated with fluid flow in the wellbore, pressure drop through perforations in a wellbore casing, pressure drop due to near-wellbore formation tortuosity, and pressure drop due to flow through the fracture.

18. The method of claim 17, wherein pressure drop associated with the fluid flow through the fracture is related to at least one of fracture tortuosity and fracture complexity.

19. The method of claim 15, wherein the fracture property comprises at least one of fracture width, fracture length, fracture compliance, fracture closure pressure and fracture permeability.

20. A method for characterizing a wellbore, comprising:
inducing water hammer in a wellbore by causing a pressure change in the wellbore;
detecting at least one of pressure and time derivative of pressure in the wellbore;
autocorrelating the detected at least one of pressure and time derivative; and
determining a change in structure of the wellbore from a result of the autocorrelating, the result comprising determining a change in time between events in the detected at least one of pressure and time derivative of pressure corresponding to the water hammer, wherein the determining change in structure comprises (i) detecting movement of a plug in the wellbore or (ii) determining whether the plug in the wellbore is open or closed.

21. The method of claim 20 wherein the detecting movement comprises identifying a change in polarity of the result of the autocorrelating.

22. The method of claim 20 further comprising: pumping fluid into the wellbore; repeating the inducing a pressure change, detecting at least one of pressure and time derivative of pressure, autocorrelating the detected at least one of pressure and time derivative of pressure; and determining a further change in structure in the wellbore.

23. The method of claim 22 wherein the determining the further change in structure comprises detecting movement of the plug in the wellbore.

24. The method of claim 22 wherein the detecting movement comprises identifying a change in polarity of the result of the autocorrelating.

25. The method of claim 22 wherein the determining further change in structure comprises determining whether a plug in the wellbore is open or closed.

26. The method of claim 20, wherein the inducing a pressure change in the wellbore comprises pumping a hydraulic fracturing treatment.

\* \* \* \* \*